(12) United States Patent
Huang et al.

(10) Patent No.: US 12,375,168 B1
(45) Date of Patent: Jul. 29, 2025

(54) METHOD AND APPARATUS FOR HANDLING SATELLITE SWITCHING IN A WIRELESS COMMUNICATION SYSTEM

(71) Applicant: ASUS Technology Licensing Inc., Taipei (TW)

(72) Inventors: Yi-Hsuan Huang, Taipei (TW); Meng-Hui Ou, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 19/030,820

(22) Filed: Jan. 17, 2025

Related U.S. Application Data

(60) Provisional application No. 63/549,298, filed on Feb. 2, 2024, provisional application No. 63/625,216, filed on Jan. 25, 2024.

(51) Int. Cl.
*H04B 7/185* (2006.01)
*H04W 56/00* (2009.01)
*H04W 84/06* (2009.01)

(52) U.S. Cl.
CPC ...... *H04B 7/18541* (2013.01); *H04W 56/001* (2013.01); *H04W 84/06* (2013.01)

(58) Field of Classification Search
CPC . H04B 7/18541; H04W 56/001; H04W 84/06
See application file for complete search history.

(56) References Cited

U.S. PATENT DOCUMENTS 12,231,221 B1 * 2/2025 Huang .............. H04W 56/0045
2025/0024413 A1 * 1/2025 Khoshkholgh Dashtaki ...............
H04B 7/18513

FOREIGN PATENT DOCUMENTS

WO       2024064352 A1    3/2024

OTHER PUBLICATIONS

Panasonic; Cell (re)selection—discussion on broadcasting SIB19 in terrestrial networks; 3GPP TSG RAN WG2 #124; R2-2311888; Nov. 13-17, 2023; 3 pages.
Huawei, HiSilicon, Turkcell; Discussion on TN broadcasting NTN assistance information; 3GPP TSG-RAN WG2 Meeting #124; R2-2313079; Nov. 13-17, 2023; 3 pages.

* cited by examiner

*Primary Examiner* — Kyaw Z Soe
(74) *Attorney, Agent, or Firm* — Skaar Ulbrich Macari, P.A.

(57) ABSTRACT

Methods, systems, and apparatuses are provided for handling satellite switching in a wireless communication system, wherein a method of a User Equipment (UE) comprises receiving a System Information Block 19 (SIB19) at a first timing, wherein the UE is in Radio Resource Control (RRC)_IDLE or RRC_INACTIVE at the first timing, and determining to initiate a satellite switch with resynchronization at a second timing when the UE is in RRC_CONNECTED, based on SatSwitchWithResync and t-Service being included in the SIB19.

20 Claims, 23 Drawing Sheets 5.2.2.4.21   Actions upon reception of *SIB19*

Upon receiving *SIB19* in an NTN cell, the UE ~~in RRC_CONNECTED~~ shall:

1> if the UE is in RRC_CONNECTED:

2> start or restart T430 for serving cell with the timer value set to *ntn-UlSyncValidityDuration* for the serving cell from the subframe indicated by *epochTime* for the serving cell;

1> if *satSwitchWithReSync* and *t-Service* are included, and the UE supports hard satellite switch with resynchronization:

2> if *t-ServiceStart* is included and the UE supports soft satellite switch with resynchronization:

3> perform the satellite switch with resynchronization as specified in 5.7.19 between the time indicated by *t-ServiceStart* and the time indicated by *t-Service* for the serving cell.

2> else:

3> perform the satellite switch with resynchronization as specified in 5.7.19 at the time indicated by *t-Service* for the serving cell.

NOTE:   UE should attempt to re-acquire *SIB19* before the end of the duration indicated by *ntn-UlSyncValidityDuration* and *epochTime* by UE implementation.

FIG. 15

| 5.2.2.4.21 | Actions upon reception of *SIB19* |

Upon receiving *SIB19* in an NTN cell, the UE ~~in RRC_CONNECTED~~ shall:

1> if the UE is in RRC_CONNECTED:

2> start or restart T430 for serving cell with the timer value set to *ntn-UlSyncValidityDuration* for the serving cell from the subframe indicated by *epochTime* for the serving cell;

1> if *satSwitchWithReSync* and *t-Service* are included, and the UE supports hard satellite switch with resynchronization:

2> if *t-ServiceStart* is included and the UE supports soft satellite switch with resynchronization:

3> perform the satellite switch with resynchronization as specified in 5.7.19 between the time indicated by *t-ServiceStart* and the time indicated by *t-Service* for the serving cell if the UE is in RRC_CONNECTED.

2> else:

3> perform the satellite switch with resynchronization as specified in 5.7.19 at the time indicated by *t-Service* for the serving cell if the UE is in RRC_CONNECTED.

NOTE:    UE should attempt to re-acquire *SIB19* before the end of the duration indicated by *ntn-UlSyncValidityDuration* and *epochTime* by UE implementation.

FIG. 16

5.2.2.4.21    Actions upon reception of *SIB19*

Upon receiving *SIB19* in an NTN cell, the UE ~~in RRC_CONNECTED~~ shall:

1> if the UE is in RRC_CONNECTED:

2> start or restart T430 for serving cell with the timer value set to *ntn-UlSyncValidityDuration* for the serving cell from the subframe indicated by *epochTime* for the serving cell;

1> if *satSwitchWithReSync* and *t-Service* are included, and the UE supports hard satellite switch with resynchronization:

2> if *t-ServiceStart* is included and the UE supports soft satellite switch with resynchronization:

3> perform the satellite switch with resynchronization as specified in 5.7.19 between the time indicated by *t-ServiceStart* and the time indicated by *t-Service* for the serving cell **if the UE is in RRC_CONNECTED after the time indicated by *t-ServiceStart*.**

2> else:

3> perform the satellite switch with resynchronization as specified in 5.7.19 at the time indicated by *t-Service* for the serving cell **if the UE is in RRC_CONNECTED at the time indicated by *t-Service*.**

NOTE:    UE should attempt to re-acquire *SIB19* before the end of the duration indicated by *ntn-UlSyncValidityDuration* and *epochTime* by UE implementation.

FIG. 17

5.2.2.4.21      Actions upon reception of *SIB19*

Upon receiving *SIB19* in an NTN cell, the UE ~~in RRC_CONNECTED~~ shall:

1> if the UE is in RRC_CONNECTED:

2> start or restart T430 for serving cell with the timer value set to *ntn-UlSyncValidityDuration* for the serving cell from the subframe indicated by *epochTime* for the serving cell;

1> if *satSwitchWithReSync* and *t-Service* are included, and the UE supports hard satellite switch with resynchronization:

2> if *t-ServiceStart* is included and the UE supports soft satellite switch with resynchronization:

3> **if the UE is in RRC_CONNECTED after the time indicated by *t-ServiceStart*:**

4> perform the satellite switch with resynchronization as specified in 5.7.19 between the time indicated by *t-ServiceStart* and the time indicated by *t-Service* for the serving cell.

2> else:

3> **if the UE is in RRC_CONNECTED at the time indicated by *t-Service*:**

4> perform the satellite switch with resynchronization as specified in 5.7.19 at the time indicated by *t-Service* for the serving cell.

NOTE:    UE should attempt to re-acquire *SIB19* before the end of the duration indicated by *ntn-UlSyncValidityDuration* and *epochTime* by UE implementation.

FIG. 18

> 5.2.2.4.21    Actions upon reception of *SIB19*
>
> Upon receiving *SIB19* in an NTN cell, the UE ~~in RRC_CONNECTED~~ shall:
>
> 1> if the UE is in RRC_CONNECTED:
>
>   2> start or restart T430 for serving cell with the timer value set to *ntn-UlSyncValidityDuration* for the serving cell from the subframe indicated by *epochTime* for the serving cell;
>
> 1> if *satSwitchWithReSync* and *t-Service* are included, and the UE supports hard satellite switch with resynchronization:
>
>   2> if *t-ServiceStart* is included and the UE supports soft satellite switch with resynchronization:
>
>     3> perform the satellite switch with resynchronization as specified in 5.7.19 between the time indicated by *t-ServiceStart* and the time indicated by *t-Service* for the serving cell if the UE is in RRC_CONNECTED and the timer T304 is not running.
>
>   2> else:
>
>     3> perform the satellite switch with resynchronization as specified in 5.7.19 at the time indicated by *t-Service* for the serving cell if the UE is in RRC_CONNECTED and the timer T304 is not running.
>
>   NOTE:   UE should attempt to re-acquire *SIB19* before the end of the duration indicated by *ntn-UlSyncValidityDuration* and *epochTime* by UE implementation.

FIG. 19

5.2.2.4.21    Actions upon reception of *SIB19*

Upon receiving *SIB19* in an NTN cell, the UE ~~in RRC_CONNECTED~~ shall:

1> if the UE is in RRC_CONNECTED:

2> start or restart T430 for serving cell with the timer value set to *ntn-UlSyncValidityDuration* for the serving cell from the subframe indicated by *epochTime* for the serving cell;

1> if *satSwitchWithReSync* and *t-Service* are included, and the UE supports hard satellite switch with resynchronization:

2> if *t-ServiceStart* is included and the UE supports soft satellite switch with resynchronization:

3> perform the satellite switch with resynchronization as specified in 5.7.19 between the time indicated by *t-ServiceStart* and the time indicated by *t-Service* for the serving cell**, if the UE is in RRC_CONNECTED and the timer T304 is not running after/at the time indicated by *t-ServiceStart*.**

2> else:

3> perform the satellite switch with resynchronization as specified in 5.7.19 at the time indicated by *t-Service* for the serving cell**, if the UE is in RRC_CONNECTED and the timer T304 is not running at the time indicated by *t-Service*.**

NOTE:  UE should attempt to re-acquire *SIB19* before the end of the duration indicated by *ntn-UlSyncValidityDuration* and *epochTime* by UE implementation.

FIG. 20

5.2.2.4.21    Actions upon reception of *SIB19*

Upon receiving *SIB19* in an NTN cell, the UE ~~in RRC_CONNECTED~~ shall:

1> if the UE is in RRC_CONNECTED:

2> start or restart T430 for serving cell with the timer value set to *ntn-UlSyncValidityDuration* for the serving cell from the subframe indicated by *epochTime* for the serving cell;

1> if *satSwitchWithReSync* and *t-Service* are included, and the UE supports hard satellite switch with resynchronization:

2> if *t-ServiceStart* is included and the UE supports soft satellite switch with resynchronization:

3> **if the UE is in RRC_CONNECTED the timer T304 is not running after/at the time indicated by *t-ServiceStart*:**

4> perform the satellite switch with resynchronization as specified in 5.7.19 between the time indicated by *t-ServiceStart* and the time indicated by *t-Service* for the serving cell.

2> else:

3> **if the UE is in RRC_CONNECTED the timer T304 is not running at the time indicated by *t-Service*:**

4> perform the satellite switch with resynchronization as specified in 5.7.19 at the time indicated by *t-Service* for the serving cell.

NOTE:    UE should attempt to re-acquire *SIB19* before the end of the duration indicated by *ntn-UlSyncValidityDuration* and *epochTime* by UE implementation.

FIG. 21

5.2.2.4.21   Actions upon reception of *SIB19*

Upon receiving *SIB19* in an NTN cell, the UE ~~in RRC_CONNECTED~~ shall:

1> <u>if the UE is in RRC_CONNECTED:</u>

2> start or restart T430 for serving cell with the timer value set to *ntn-UlSyncValidityDuration* for the serving cell from the subframe indicated by *epochTime* for the serving cell;

1> if *satSwitchWithReSync* and *t-Service* are included, and the UE supports hard satellite switch with resynchronization:

2> if *t-ServiceStart* is included and the UE supports soft satellite switch with resynchronization:

3> perform the satellite switch with resynchronization as specified in 5.7.19 between the time indicated by *t-ServiceStart* and the time indicated by *t-Service* for the serving cell <u>if the UE is in RRC_CONNECTED (after the time indicated by *t-ServiceStart*)</u>;

3> <u>perform the satellite switch with resynchronization as specified in 5.7.xx between the time indicated by *t-ServiceStart* and the time indicated by *t-Service* for the serving cell if the UE is in RRC_IDLE/RRC_INACTIVE (after the time indicated by *t-ServiceStart*).</u>

2> else:

3> perform the satellite switch with resynchronization as specified in 5.7.19 at the time indicated by *t-Service* for the serving cell <u>if the UE is in RRC_CONNECTED (at the time indicated by *t-Service*)</u>;

3> <u>perform the satellite switch with resynchronization as specified in 5.7.xx at the time indicated by *t-Service* for the serving cell if the UE is in RRC_IDLE/RRC_INACTIVE (at the time indicated by *t-Service*).</u>

NOTE:   UE should attempt to re-acquire *SIB19* before the end of the duration indicated by *ntn-UlSyncValidityDuration* and *epochTime* by UE implementation.

FIG. 23

5.2.2.4.21   Actions upon reception of *SIB19*

Upon receiving *SIB19* in an NTN cell, the UE ~~in RRC_CONNECTED~~ shall:

1> if the UE is in RRC_CONNECTED:

2> start or restart T430 for serving cell with the timer value set to *ntn-UlSyncValidityDuration* for the serving cell from the subframe indicated by *epochTime* for the serving cell;

1> if *satSwitchWithReSync* and *t-Service* are included, and the UE supports hard satellite switch with resynchronization:

2> if *t-ServiceStart* is included and the UE supports soft satellite switch with resynchronization:

3> **if the UE is in RRC_CONNECTED after the time indicated by *t-ServiceStart*:**

4> perform the satellite switch with resynchronization as specified in 5.7.19 between the time indicated by *t-ServiceStart* and the time indicated by *t-Service* for the serving cell~~;~~;

3> else:

**4> perform the satellite switch with resynchronization as specified in 5.7.xx between the time indicated by *t-ServiceStart* and the time indicated by *t-Service* for the serving cell;**

2> else:

3> **if the UE is in RRC_CONNECTED at the time indicated by *t-Service*:**

4> perform the satellite switch with resynchronization as specified in 5.7.19 at the time indicated by *t-Service* for the serving cell~~;~~;

3> else:

**4> perform the satellite switch with resynchronization as specified in 5.7.xx at the time indicated by *t-Service* for the serving cell.**

NOTE:   UE should attempt to re-acquire *SIB19* before the end of the duration indicated by *ntn-UlSyncValidityDuration* and *epochTime* by UE implementation.

FIG. 24

5.7.19 Satellite switch with re-synchronization ~~in RRC_CONNECTED~~

The UE shall:

1> if the UE is in RRC_CONNECTED:

2> stop timer T430 if running;

~~1~~2> inform lower layers that UL synchronization is lost due to satellite switch with re-synchronization;

1> start re-synchronizing to the DL of the SpCell served by the satellite indicated by *ntn-Config* in *SatSwitchWithReSync*;

1> if the UE is in RRC_CONNECTED:

~~1~~2> start timer T430 with the timer value set to *ntn-UlSyncValidityDuration* from the subframe indicated by *epochTime* in *ntn-Config* in *SatSwitchWithReSync*;

~~1~~2> inform lower layers when UL synchronization is obtained.

FIG. 25

5.7.XX  Satellite switch with re-synchronization in RRC_INACTIVE/RRC_IDLE

The UE shall:

1> start re-synchronizing to the DL of the SpCell served by the satellite indicated by *ntn-Config* in *SatSwitchWithReSync*.

FIG. 26

METHOD AND APPARATUS FOR HANDLING SATELLITE SWITCHING IN A WIRELESS COMMUNICATION SYSTEM

CROSS-REFERENCE TO RELATED APPLICATIONS

The present Application claims priority to and the benefit of U.S. Provisional Patent Application Ser. No. 63/625,216, filed Jan. 25, 2024, and U.S. Provisional Patent Application Ser. No. 63/549,298, filed Feb. 2, 2024; with each of the listed and referenced applications and disclosures fully incorporated herein by reference.

FIELD

This disclosure generally relates to wireless communication networks and, more particularly, to a method and apparatus for handling satellite switching in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for handling satellite switching in a wireless communication system. A User Equipment (UE) could properly perform a satellite switch with resynchronization when satellite switching happens. In a case that the System Information Block 19 (SIB19) is received when the UE is in Radio Resource Control (RRC)_IDLE or RRC_INACTIVE (and enters RRC_CONNECTED later on), the UE in RRC_CONNECTED could initiate a satellite switch with resynchronization.

In various embodiments, a method of a UE comprises receiving an SIB19 at a first timing, wherein the UE is in RRC_IDLE or RRC_INACTIVE at the first timing, and determining to initiate a satellite switch with resynchronization at a second timing when the UE is in RRC_CONNECTED, based on SatSwitchWithResync and t-Service being included in the SIB19.

BRIEF DESCRIPTION OF THE DRAWINGS

FIG. 15 is a text proposal for implementation on top of [3] 3GPP TS 38.331 V18.0.0, wherein the UE determines whether to perform/initiate the satellite switch with resynchronization regardless of the RRC state when/upon the UE receives SIB19, in accordance with embodiments of the present invention.

FIG. 16 is a text proposal for implementation on top of [3] 3GPP TS 38.331 V18.0.0, wherein the UE determines whether to perform/initiate the satellite switch with resynchronization based on the UE is in RRC_CONNECTED state at the time indicated by t-Service, or between the time indicated by t-ServiceStart and the time indicated by t-Service, regardless of the RRC state when/upon the UE receives SIB19, in accordance with embodiments of the present invention.

FIG. 17 is a text proposal for implementation on top of [3] 3GPP TS 38.331 V18.0.0, wherein the UE determines whether to perform/initiate the satellite switch with resynchronization based on the UE is in RRC_CONNECTED state at the time indicated by t-Service, or between the time indicated by t-ServiceStart and the time indicated by t-Service, regardless of the RRC state when/upon the UE receives SIB19, in accordance with embodiments of the present invention.

FIG. 18 is a text proposal for implementation on top of [3] 3GPP TS 38.331 V18.0.0, wherein the UE determines whether to perform/initiate the satellite switch with resynchronization based on the UE is in RRC_CONNECTED state at the time indicated by t-Service, or between the time indicated by t-ServiceStart and the time indicated by t-Service, regardless of the RRC state when/upon the UE receives SIB19, in accordance with embodiments of the present invention.

FIG. 19 is a text proposal for implementation on top of [3] 3GPP TS 38.331 V18.0.0, the UE determines whether to perform/initiate the satellite switch with resynchronization based on the UE is in RRC_CONNECTED state and the timer T304 is not running at the time indicated by t-Service, after the time indicated by t-ServiceStart, or between the time indicated by t-ServiceStart and the time indicated by t-Service, regardless of the RRC state when/upon the UE receives SIB19, in accordance with embodiments of the present invention.

FIG. 20 is a text proposal for implementation on top of [3] 3GPP TS 38.331 V18.0.0, the UE determines whether to perform/initiate the satellite switch with resynchronization based on the UE is in RRC_CONNECTED state and the timer T304 is not running at the time indicated by t-Service, after the time indicated by t-ServiceStart, or between the time indicated by t-ServiceStart and the time indicated by t-Service, regardless of the RRC state when/upon the UE receives SIB19, in accordance with embodiments of the present invention.

FIG. 21 is a text proposal for implementation on top of [3] 3GPP TS 38.331 V18.0.0, the UE determines whether to perform/initiate the satellite switch with resynchronization based on the UE is in RRC_CONNECTED state and the timer T304 is not running at the time indicated by t-Service, after the time indicated by t-ServiceStart, or between the time indicated by t-ServiceStart and the time indicated by t-Service, regardless of the RRC state when/upon the UE receives SIB19, in accordance with embodiments of the present invention.

FIG. 23 is a text proposal for implementation on top of [3] 3GPP TS 38.331 V18.0.0, wherein the UE determines to perform/initiate a first satellite switch with resynchronization based on the UE is in RRC_CONNECTED state at the time indicated by t-Service, after the time indicated by t-ServiceStart, or between the time indicated by t-ServiceStart and the time indicated by t-Service, regardless of the RRC state when/upon the UE receives SIB19, in accordance with embodiments of the present invention.

FIG. 24 is a text proposal for implementation on top of 3GPP TS 38.331 V18.0.0 [3], wherein the UE determines to perform/initiate a first satellite switch with resynchronization based on the UE is in RRC_CONNECTED state at the time indicated by t-Service, after the time indicated by t-ServiceStart, or between the time indicated by t-ServiceStart and the time indicated by t-Service, regardless of the RRC state when/upon the UE receives SIB19, in accordance with embodiments of the present invention.

FIG. 25 is a text proposal for implementation on top of [3] 3GPP TS 38.331 V18.0.0, the UE determines not to perform/initiate a second action(s) during a satellite switch with resynchronization based on the UE is not in an RRC_CONNECTED state, in accordance with embodiments of the present invention.

FIG. 26 is a text proposal for implementation on top of [3] 3GPP TS 38.331 V18.0.0, wherein the UE performs a second satellite switch with resynchronization, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP $N_R$ (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] Draft 3GPP TS 38.300 V18.0.0, "$N_R$, $N_R$ and NG-RAN Overall Description, Stage 2."; [2] Draft 3GPP TS 38.321 V18.0.0, "$N_R$, MAC protocol specification."; [3] Draft 3GPP TS 38.331 V18.0.0, "$N_R$, RRC protocol specification."; [4] R2-2308373, "Satellite Switch: PCI change without L3 handover," NEC; and [5] R2-2310307, "Satellite switching with unchanged PCI", Apple. The standards and documents listed above are hereby expressly and fully incorporated herein by reference in their entirety.

Figure 1:
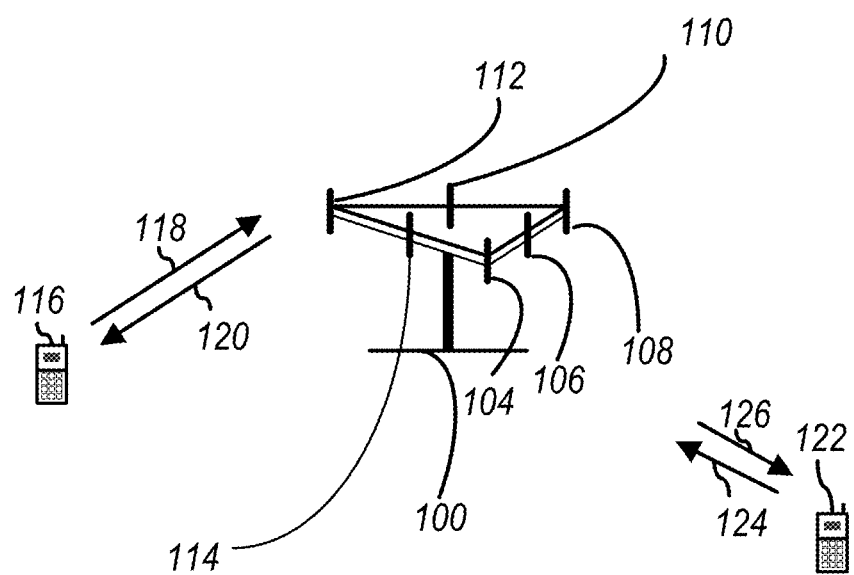
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
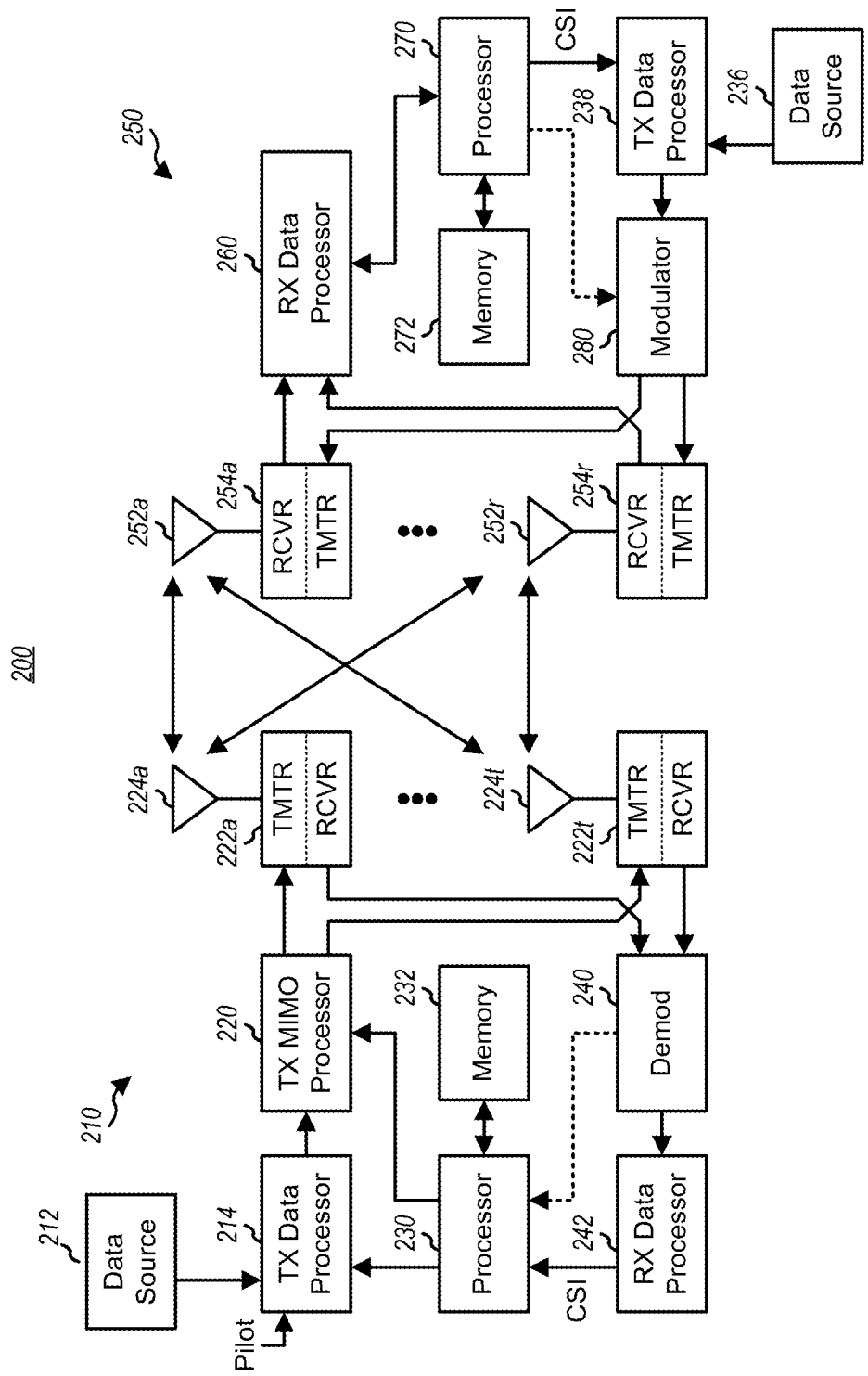
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
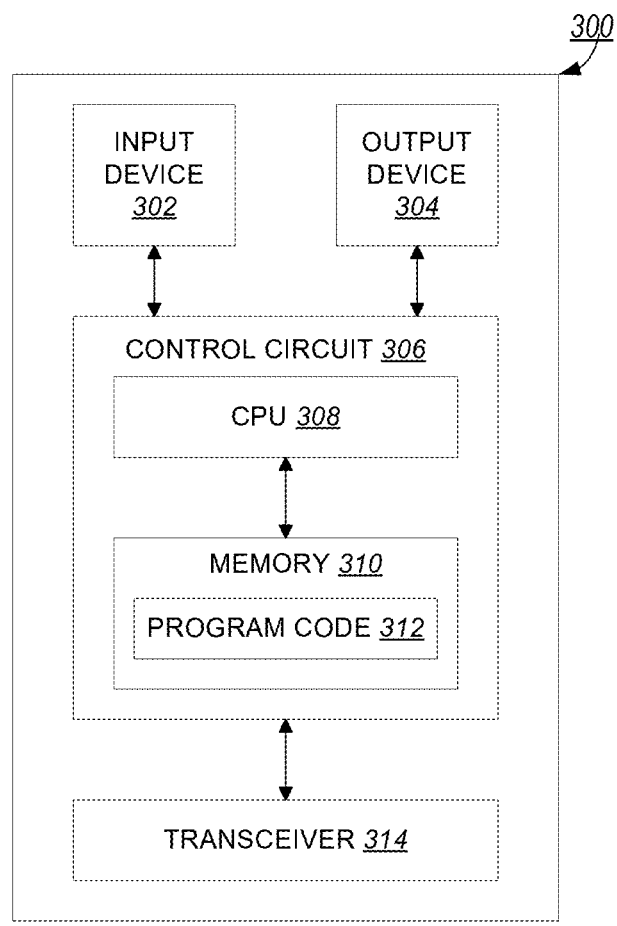
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the $N_R$ system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
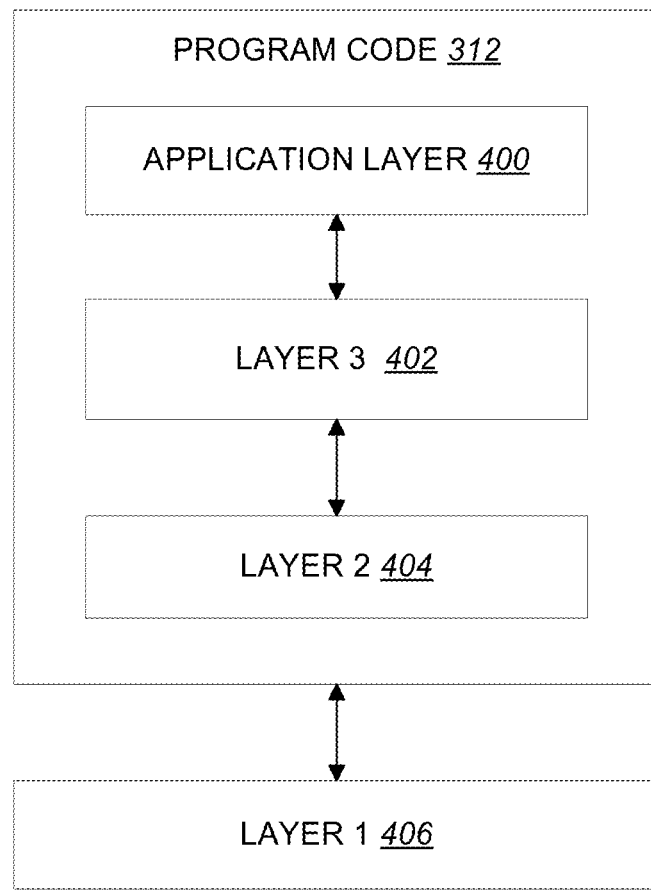
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or $N_R$ systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-) bullets, points, actions, or claims described in each invention paragraph or section may be combined logically, reasonably, and properly to form a specific method.

Any sentence, paragraph, (sub-) bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

The general description of Rel-18 $N_R$ non-terrestrial networks (NTN) is specified in TS 38.300 ([1] Draft 3GPP TS 38.300 V18.0.0) as below:

\*\*\*Quotation Start [1]\*\*\*

16.14 Non-Terrestrial Networks
16.14.1 Overview

Figure 16.14.1-1 below illustrates an example of a Non-Terrestrial Network (NTN) providing non-terrestrial $N_R$ access to the UE by means of an NTN payload and an NTN Gateway, depicting a service link between the NTN payload and a UE, and a feeder link between the NTN Gateway and the NTN payload.

Figure 5:
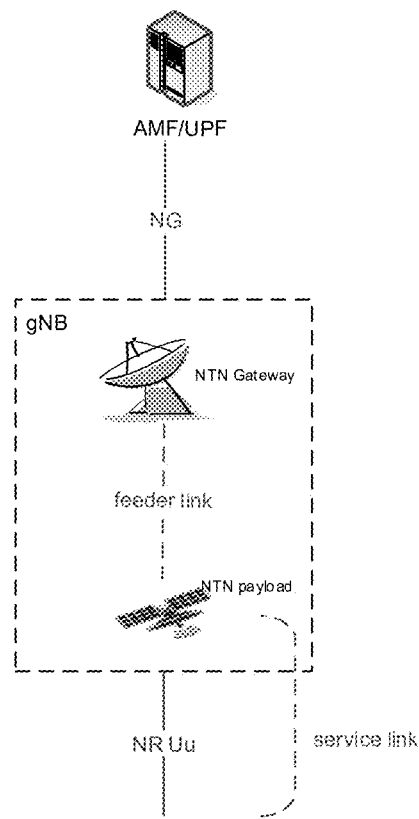
FIG. 5 is a reproduction of Figure 16.14.1-1: Overall illustration of an NTN, from Draft 3GPP TS 38.300 V18.0.0.

FIG. 5 is a reproduction of Figure 16.14.1-1: Overall illustration of an NTN, from Draft 3GPP TS 38.300 V18.0.0.

. . .

The NTN payload transparently forwards the radio protocol received from the UE (via the service link) to the NTN Gateway (via the feeder link) and vice-versa. The following connectivity is supported by the NTN payload:

An NTN gateway may serve multiple NTN payloads;

An NTN payload may be served by multiple NTN gateways.

NOTE 2: In this release, the NTN-payload may change the carrier frequency, before re-transmitting it on the service link, and vice versa (respectively on the feeder link).

. . .

Three types of service links are supported:

Earth-fixed: provisioned by beam(s) continuously covering the same geographical areas all the time (e.g., the case of GSO satellites);

Quasi-Earth-fixed: provisioned by beam(s) covering one geographic area for a limited period and a different geographic area during another period (e.g., the case of NGSO satellites generating steerable beams);

Earth-moving: provisioned by beam(s) whose coverage area slides over the Earth surface (e.g., the case of NGSO satellites generating fixed or non-steerable beams).

With NGSO satellites, the gNB can provide either quasi-Earth-fixed service link or Earth-moving service link, while gNB operating with GSO satellite can provide Earth fixed service link.

In this release, the UE supporting NTN is GNSS-capable.

In NTN, the distance refers to Euclidean distance.

16.14.2 Timing and Synchronization
16.14.2.1 Scheduling and Timing

DL and UL are frame aligned at the uplink time synchronization reference point (RP) with an offset given by $N_{TA,offset}$ (see clause 4.2 of TS 38.213).

To accommodate the propagation delay in NTNs, several timing relationships are enhanced by a Common Timing Advance (Common TA) and two offsets $K_{offset}$ and $k_{mac}$:

Common TA is a configured timing offset that is equal to the RTT between the RP and the NTN payload.

$K_{offset}$ is a configured scheduling offset that needs to be larger or equal to the sum of the service link RTT and the Common TA.

$k_{mac}$ is a configured offset that is approximately equal to the RTT between the RP and the gNB.

The scheduling offset $K_{offset}$ is used to allow the UE sufficient processing time between a downlink reception and an uplink transmission, see TS 38.213.

The offset $k_{mac}$ is used to delay the application of a downlink configuration indicated by a MAC CE command on PDSCH, see TS 38.213, and in estimation of UE-gNB RTT, see TS 38.321. It may be provided by the network when downlink and uplink frame timing are not aligned at gNB. The $k_{mac}$ is also used in the random access procedure, to determine the start time of RAR window/MsgB window after a Msg1/MsgA transmission (see TS 38.213).

The Service link RTT, Feeder link RTT, RP, Common TA, $k_{mac}$ and $T_{TA}$ (see clause 16.14.2.2) are illustrated in Figure 16.14.2.1-1.

Figure 6:
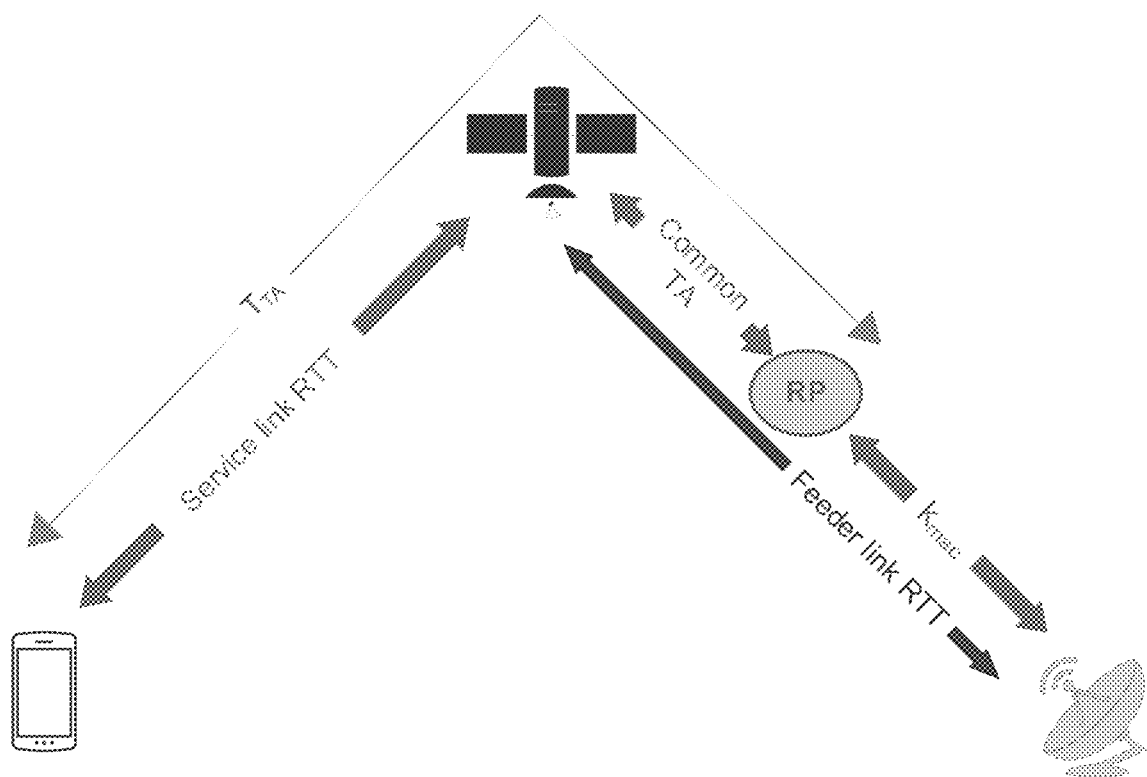
FIG. 6 is a reproduction of Figure 16.14.2.1-1: Illustration of timing relationship (for collocated gNB and NTN Gateway), from Draft 3GPP TS 38.300 V18.0.0.

FIG. 6 is a reproduction of Figure 16.14.2.1-1: Illustration of timing relationship (for collocated gNB and NTN Gateway), from Draft 3GPP TS 38.300 V18.0.0.

. . .

16.14.2.2 Timing Advance and Frequency Pre-Compensation

For the serving cell, the network broadcast valid ephemeris information and Common TA parameters. The UE shall have valid GNSS position as well as ephemeris and Common TA before connecting to an NTN cell. To achieve synchronisation, before and during connection to an NTN cell, the UE shall compute the RTT between UE and the RP based on the GNSS position, the ephemeris, and the Common TA parameters (see clause 4.2 in TS 38.213), and autonomously pre-compensate the $T_{TA}$ for the RTT between the UE and the RP as illustrated in Figure 16.14.2.1-1 (see clause 4.3 of TS 38.211).

The UE shall compute the frequency Doppler shift of the service link, and autonomously pre-compensate for it in the uplink transmissions, by considering UE position and the ephemeris. If the UE does not have a valid GNSS position and/or valid ephemeris and Common TA, it shall not transmit until both are regained.

In connected mode, the UE shall be able to continuously update the Timing Advance and frequency pre-compensation.

The UE may be configured to report Timing Advance during Random Access procedures or in connected mode. In connected mode, event-triggered reporting of the Timing Advance is supported.

. . .

16.14.3 Mobility and State Transition
16.14.3.1 Mobility in RRC_IDLE and RRC_INACTIVE The same principles as described in 9.2.1 apply to mobility in RRC_IDLE for NTN and the same principles as described in 9.2.2 apply to mobility in RRC_INACTIVE for NTN unless hereunder specified.

The network may broadcast multiple Tracking Area Codes (TACs) per PLMN in an NR NTN cell. A TAC change in the System Information is under network control, i.e. it may not be exactly synchronised with real-time illumination of beams on ground.

For the NTN-TN mobility, the network may broadcast cell information on $N_R$ TN and EUTRA TN coverage areas in SIB25. This is supported for Earth-Fixed, Quasi-Earth-fixed and Earth-Moving cells. The coverage information consists in a list of geographical TN areas, with associated frequency information also indicated. UE can skip TN measurement based on the broadcast TN coverage information.

The UE can determine the network type (terrestrial or non-terrestrial) implicitly by the existence of cell-BarredNTN in SIB1.

The NTN ephemeris is provided in SIB19. In an NTN cell, it includes serving cell's NTN payload ephemeris and optionally neighbouring cell's NTN payload ephemeris.

16.14.3.2 Mobility in RRC_CONNECTED 16.14.3.2.1 Handover

The same principle as described in 9.2.3.2 applies unless hereunder specified:

During mobility between NTN and Terrestrial Network (TN), a UE is not required to connect to both NTN and TN at the same time.

NOTE: NTN TN handover refers to mobility in both directions, i.e. from NTN to TN (hand-in) and from TN to NTN (hand-out).

DAPS handover is not supported for NTN in this release of the specification.

UE may support mobility between gNBs operating with NTN payloads in different orbits (e.g., GSO, NGSO at different altitudes).

RACH-less handover as specified in TS 38.321 is supported in NTNs.

16.14.3.2.2 Conditional Handover

The same principle as described in 9.2.3.4 applies to NTN unless hereunder specified.

NTN supports the following additional trigger conditions upon which UE may execute CHO to a candidate cell, as defined in TS 38.331:

The RRM measurement-based event A4;

A time-based trigger condition;

A location-based trigger condition.

Time-based or location-based trigger conditions may be configured independently from the measurement condition for CHO in NTN in at least hard satellite switch case where the service discontinuity gap time length is assumed to be zero or negligible. Otherwise, a time-based or a location-based trigger condition is always configured together with one of the measurement-based trigger conditions (CHO events A3/A4/A5) as defined in TS 38.331.

A time-based or a location-based trigger condition is always configured together with one of the measurement-based trigger conditions (CHO events A3/A4/A5) as defined in TS 38.331.

It is up to UE implementation how the UE evaluates the time- or location-based trigger condition together with the RRM measurement-based event.

When a time-based trigger condition is used, the source gNB may signal the corresponding parameters to a single target gNB via the Source NG-RAN Node to Target NG-RAN Node Transparent Container in an NG-C based handover, see TS 23.502 [22]. The source gNB signals the corresponding CHO configuration to the UE in the RRC Reconfiguration message during handover execution.

When time-based trigger condition is used, the source NG-RAN node should consider the time indicated to the UE to decide when to start the early data forwarding to the target NG-RAN node.

Time-based CHO can be performed via RACH-less.

16.14.3.2.3 Satellite Switch with Re-Sync

Upon both hard and soft satellite switch over in the quasi-Earth fixed scenario with the same SSB frequency and the same gNB, the satellite switch with re-sync procedure is supported. The satellite switch with re-sync avoids a L3 mobility for UEs in the cell by maintaining the same PCI on the geographical area covered by quasi-Earth fixed beam. CHO can be configured simultaneously with the satellite switch with re-sync procedure.

For soft satellite switch over, the UE can start synchronizing with the target satellite before the source satellite ends to serve the cell. It is not required for the UE to be connected to source satellite when the UE switches to target satellite.

16.14.3.3 Measurements

The same principle as described in 9.2.4 applies to measurements in NTN unless hereunder specified.

The network can configure:

multiple SMTCs in parallel per carrier and for a given set of cells depending on UE capabilities;

measurement gaps based on multiple SMTCs;

assistance information (e.g., ephemeris, Common TA parameters, $k_{mac}$) provided in SIB19 for UE to perform measurement on neighbour cells in RRC_IDLE/RRC_INACTIVE/RRC_CONNECTED.

NW-controlled adjustment of SMTCs can be based on UE assistance information reported in RRC_CONNECTED. A UE in RRC_IDLE/RRC_INACTIVE can adjust SMTCs based on its location and assistance information in SIB19.

UE assistance information consists of the service link propagation delay difference(s) between serving the cell and neighbour cell(s).

For a UE in Idle/Inactive mode it's up to UE implementation whether to perform NTN neighbour cell measurements on a cell indicated in SIB3/SIB4 but not included in SIB19.

For a UE in Connected mode, it's up to UE implementation whether to perform NTN neighbour cell measurements on a cell included in the measurement configuration but not included in SIB19.

IUE can perform time-based and location-based measurements on neighbour cells in RRC_IDLE/RRC_INACTIVE:

The timing and location information associated to the serving cell is provided in SIB19;

Timing information refers to the UTC time when the serving cell stops serving the current geographical area;

Location information refers:

In the quasi-Earth fixed cell scenario, to the reference location of the serving cell and a distance threshold to the reference location.

In the Earth moving cell scenario, to the reference location of the serving cell at the epoch time and a distance threshold to the reference location.

The time-based measurement initiation may be applicable for the feeder link switchover case for cell (re) selection.

Measurement rules for cell re-selection based on timing information and location information are specified in clause 5.2.4.2 in TS 38.304.

*Quotation End*

The UL synchronization timer (e.g. T430) handling is specified in TS 38.331 ([3] Draft 3GPP TS 38.331 V18.0.0) and TS 38.321 ([2] Draft 3GPP TS 38.321 V18.0.0) as below:

*Quotation Start [3]*

5.2.2 System Information Acquisition
5.2.2.4 Actions Upon Receipt of System Information
5.2.2.4.21 Actions Upon Reception of SIB19
Upon receiving SIB19 in an NTN cell, the UE in RRC_CONNECTED shall:
1> start or restart T430 for serving cell with the timer value set to ntn-UlSyncValidityDuration for the serving cell from the subframe indicated by epochTime for the serving cell;
1> if SatSwitchWithReSync and t-Service are included, and the UE supports hard satellite switch with resynchronization;
2> if t-ServiceStart is included and the UE supports soft satellite switch with resynchronization:
3> perform the satellite switch with resynchronization as specified in 5.7.19 between the time indicated by t-ServiceStart and the time indicated by t-Service for the serving cell.
2> else:
3> perform the satellite switch with resynchronization as specified in 5.7.19 at the time indicated by t-Service for the serving cell.
NOTE: UE should attempt to re-acquire SIB19 before the end of the duration indicated by ntn-UlSyncValidityDuration and epochTime by UE implementation.

*Next Quotation*

5.2.2.6 T430 Expiry
The UE shall:
1> if T430 for serving cell expires and if in RRC_CONNECTED:
2> inform lower layers that UL synchronisation is lost;
2> acquire SIB19 as defined in clause 5.2.2.3.2;
2> upon successful acquisition of SIB19:
3> inform lower layers when UL synchronisation is obtained;
NOTE: The exact time when UL synchronisation is obtained (after SIB19 is acquired) is left to UE implementation, which can be from the subframe indicated by epochTime and optionally before the subframe indicated by epochTime.

*Next Quotation*

Figure 7:
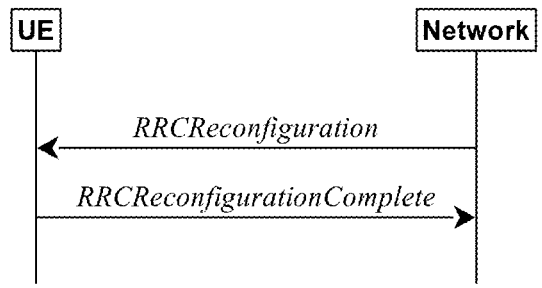
FIG. 7 is a reproduction of Figure 5.3.5.1-1: RRC reconfiguration, successful, from Draft 3GPP TS 38.331 V18.0.0.
Figure 8:
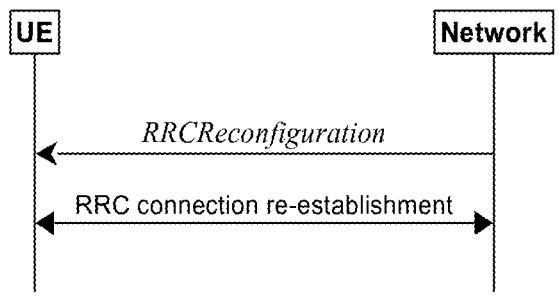
FIG. 8 is a reproduction of Figure 5.3.5.1-2: RRC reconfiguration, failure, from Draft 3GPP TS 38.331 V18.0.0.

5.3.5 RRC Reconfiguration
5.3.5.1 General
FIG. 7 is a reproduction of Figure 5.3.5.1-1: RRC reconfiguration, successful, from Draft 3GPP TS 38.331 V18.0.0.
FIG. 8 is a reproduction of Figure 5.3.5.1-2: RRC reconfiguration, failure, from Draft 3GPP TS 38.331 V18.0.0.
. . .
5.3.5.3 Reception of an RRCReconfiguration by the UE
The UE shall perform the following actions upon reception of the RRCReconfiguration, upon execution of the conditional reconfiguration (CHO, CPA or CPC), or upon execution of an LTM cell switch:
. . .
1> if the RRCReconfiguration includes the masterCellGroup:
2> perform the cell group configuration for the received masterCellGroup according to 5.3.5.5;
. . .
5.3.5.5 Cell Group Configuration
5.3.5.5.1 General
The UE performs the following actions based on a received CellGroupConfig IE:
1> if the CellGroupConfig contains the spCellConfig with reconfigurationWithSync:
2> perform Reconfiguration with sync according to 5.3.5.5.2;
. . .
5.3.5.5.2 Reconfiguration with Sync
The UE shall perform the following actions to execute a reconfiguration with sync.
1> if the AS security is not activated, perform the actions upon going to RRC_IDLE as specified in 5.3.11 with the release cause 'other' upon which the procedure ends;
1> stop timer T430 if running;
. . .
2> if this procedure is executed for the MCG or if this procedure is executed for an SCG not indicated as deactivated in the E-UTRA or $N_R$ RRC message in which the RRCReconfiguration message is embedded:
3> start timer T304 for the corresponding SpCell with the timer value set to t304, as included in the reconfigurationWithSync;
. . .
2> start synchronising to the DL of the target SpCell;
2> apply the specified BCCH configuration defined in 9.1.1.1 for the target SpCell;
2> acquire the MIB of the target SpCell, which is scheduled as specified in TS 38.213 [13];
2> if NTN-Config is configured for the target cell:
3> start timer T430 with the timer value set to ntn-UlSyncValidityDuration from the subframe indicated by epochTime, according to the target cell NTN-Config;
. . .
3> reset the MAC entity of this cell group;
3> consider the SCell(s) of this cell group, if configured, that are not included in the SCellToAddModList in the RRCReconfiguration message, to be in deactivated state;
3> apply the value of the newUE-Identity as the C-RNTI for this cell group;
3> configure lower layers in accordance with the received spCellConfigCommon;
3> if rach-LessHO is included:
4> configure lower layers in accordance with rach-LessHO for the target SpCell;
3> configure lower layers in accordance with any additional fields, not covered in the previous, if included in the received reconfigurationWithSync.
. . .
5.3.5.13 Conditional Reconfiguration
5.3.5.13.1 General
The network configures the UE with one or more candidate target SpCells in the conditional reconfiguration. The UE evaluates the condition of each configured candidate target SpCell. The UE applies the conditional reconfiguration associated with one of the target SpCells which fulfils associated execution condition.

. . .

The network provides the configuration parameters for the target SpCell(s) in the ConditionalReconfiguration IE.

. . .

5.3.5.13.4 Conditional Reconfiguration Evaluation
The UE shall:
1> for each condReconfigId within the VarConditionalReconfig:
  2> if the RRCReconfiguration within condRRCReconfig includes the masterCellGroup including the reconfigurationWithSync:
    . . .
    4> consider the cell which has a physical cell identity matching the value indicated in the Serving CellConfigCommon included in the reconfigurationWithSync within the masterCellGroup in the received condRRCReconfig to be applicable cell;
. . .
2> for each measId included in the measIdList within VarMeasConfig indicated in the condExecutionCond, condExecutionCondSCG, or condExecutionCondPSCell associated to condReconfigId:
  3> if the condTriggerConfig is not configured with nesEvent:
    4> if the condEventId is associated with condEventT1, and if the entry condition applicable for this event associated with the condReconfigId, i.e. the event corresponding with the condEventId(s) of the corresponding condTriggerConfig within VarConditionalReconfig, is fulfilled for the applicable cell; or
    4> if the condEventId is associated with condEventD1, and if the entry conditions applicable for this event associated with the condReconfigId, i.e. the event corresponding with the condEventId(s) of the corresponding condTriggerConfig within VarConditionalReconfig, is fulfilled for the applicable cell during the corresponding timeToTrigger defined for this event within the VarConditionalReconfig; or
    4> if the condEventId is associated with condEventD2, and if the entry conditions applicable for this event associated with the condReconfigId, i.e., the event corresponding with the condEventId(s) of the corresponding condTriggerConfig within VarConditionalReconfig, is fulfilled for the applicable cell during the corresponding timeToTrigger defined for this event within the VarConditionalReconfig; or
    4> if the condEventId is associated with condEventA3, condEventA4 or condEventA5, and if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
      5> consider the event associated to that measId to be fulfilled;
    4> if the measId for this event associated with the condReconfigId has been modified; or
    4> if the condEventId is associated with condEventT1, and if the leaving condition applicable for this event associated with the condReconfigId, i.e. the event corresponding with the condEventId(s) of the corresponding condTriggerConfig within VarConditionalReconfig, is fulfilled for the applicable cell; or
    4> if the condEventId is associated with condEventD1, and if the leaving condition(s) applicable for this event associated with the condReconfigId, i.e. the event corresponding with the condEventId(s) of the corresponding condTriggerConfig within VarConditionalReconfig, is fulfilled for the applicable cell during the corresponding timeToTrigger defined for this event within the VarConditionalReconfig; or
    4> if the condEventId is associated with condEventD2, and if the leaving condition(s) applicable for this event associated with the condReconfigId, i.e., the event corresponding with the condEventId(s) of the corresponding condTriggerConfig within VarConditionalReconfig, is fulfilled for the applicable cell during the corresponding timeToTrigger defined for this event within the VarConditionalReconfig; or
    4> if the condEventId is associated with condEventA3, condEventA4 or condEventA5, and if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
      5> consider the event associated to that measId to be not fulfilled;
  3> if event(s) associated to all measId(s) within condTriggerConfig for the applicable cell are fulfilled:
    4> consider the applicable cell, associated to that condReconfigId, as a triggered cell;
    4> initiate the conditional reconfiguration execution, as specified in 5.3.5.13.5;

5.3.5.13.5 Conditional Reconfiguration Execution
The UE shall:
. . .
  2> consider the triggered cell as the selected cell for conditional reconfiguration execution;
1> for the selected cell(s) of conditional reconfiguration execution:
  . . .
  3> apply the stored condRRCReconfig of the selected cell and perform the actions as specified in 5.3.5.3;

*Next Quotation*

5.7.19 Satellite Switch with Re-Synchronization in RRC_CONNECTED
The UE shall:
1> stop timer T430 if running;
1> inform lower layers that UL synchronisation is lost due to satellite switch with re-synchronization;

1> start re-synchronising to the DL of the SpCell served by the satellite indicated by ntn-Config in SatSwitchWithReSync;
1> start timer T430 with the timer value set to ntn-UlSyncValidityDuration from the subframe indicated by epochTime in ntn-Config in SatSwitchWithReSync;
1> inform lower layers when UL synchronisation is obtained.
  Editor's Note: FFS whether in the soft-switch scenario a UE can obtain DL synchronization from the target satellite without losing UL synchronization to the source satellite.

*Quotation End*

*Quotation Start [2]*

5.2a Maintenance of UL Synchronization
The MAC entity shall for each Serving Cell:
1> if an indication of uplink synchronization has been received from upper layers (see clauses 5.2.2.6 and 5.7.19 of TS 38.331):
  2> if indication of uplink synchronization is received after indication of uplink synchronization loss due to satellite switch with re-synchronization (see clause 5.7.19 of TS 38.331):
    3> set $N_{TA}$ value (as defined in TS 38.211) to zero for PTAG;
    3> indicate to lower layers a Differential Koffset with value zero.
  2> allow uplink transmission on the Serving Cell.
1> if an indication of uplink synchronization loss or uplink synchronization loss due to satellite switch with re-synchronization is received from upper layers (see clause 5.2.2.6 and 5.7.19 of TS 38.331):
  2> flush all HARQ buffers;
  2> not perform any uplink transmission on the Serving Cell.

NOTE: The MAC entity suspends all UL operations (e.g. stop RACH, SR, and UL HARQ operation) after receiving the indication of an uplink synchronization loss and resumes the operation when receiving an indication of uplink synchronization.

*Quotation End*

Some configurations related to NTN and/or satellite (information) could be provided by NW as specified in TS 38.331 ([3] Draft 3GPP TS 38.331 V18.0.0):

*****************************************Quotation Start [3]*****************************************

6.3.1 System information blocks
- SIB19
SIB19 contains satellite assistance information for NTN access.

| SIB19 information element |
| --- |

```
SIB19-r17 ::= SEQUENCE {
    ntn-Config-r17                      NTN-Config-r17
OPTIONAL,    -- Need R
    t-Service-r17                       INTEGER (0..549755813887)
OPTIONAL,    -- Need R
    referenceLocation-r17               ReferenceLocation-r17
OPTIONAL,    -- Need R
    distanceThresh-r17                  INTEGER (0..65525)
OPTIONAL,    -- Need R
    ntn-NeighCellConfigList-r17         NTN-NeighCellConfigList-r17
OPTIONAL,    -- Need R
    lateNonCriticalExtension            OCTET STRING
OPTIONAL,
    ...,
    [[
    ntn-NeighCellConfigListExt-v1720    NTN-NeighCellConfigList-r17                        OPTIONAL
-- Need R
    ]],
    [[
    movingReferenceLocation-r18         ReferenceLocation-r17
OPTIONAL,    -- Need R
    satSwitchWithReSync-r18             SatSwitchWithReSync-r18                            OPTIONAL
-- Need R
    ]]
}
NTN-NeighCellConfigList-r17 ::=         SEQUENCE (SIZE (1..maxCellNTN-r17))    OF NTN-NeighCellConfig-r17
NTN-NeighCellConfig-r17 ::=             SEQUENCE {
    ntn-Config-r17                      NTN-Config-r17
OPTIONAL,    -- Need R
    carrierFreq-r17                     ARFCN-ValueNR
OPTIONAL,    -- Need R
    physCellId-r17                      PhysCellId                                          OPTIONAL
-- Need R
}
SatSwitchWithReSync-r18 ::=             SEQUENCE {
    ntn-Config-r18                      NTN-Config-r17,
    t-ServiceStart-r18                  INTEGER (0..549755813887)
```

| | | |
|---|---|---|
| OPTIONAL, -- Need R<br>  ssb-TimeOffset-r18<br>-- Need R<br>} | INTEGER (0..159) | OPTIONAL |

| SIB19 field descriptions |
|---|
| distanceThresh<br>Distance from the serving cell reference location and is used in location-based measurement initiation in RRC_IDLE and RRC_INACTIVE, as defined in TS 38.304. Each step represents 50m. This field is only present in an NTN cell.<br>moving ReferenceLocation<br>Reference location of the serving cell of an NTN Earth moving system at a time reference. It is used in location-based measurement initiation in RRC_IDLE and RRC_INACTIVE, as defined in TS 38.304. The time reference of this field is indicated by epochTime in ntn-Config of the serving cell. This field is excluded when determining changes in system information, i.e., changes to movingReferenceLocation should neither result in system information change notifications nor in a modification of value Tag in SIB1. This field is only present in an NTN cell.<br>ntn-Config<br>Provides parameters needed for the UE to access NR via NTN access such as Ephemeris data, common TA parameters, k_offset, validity duration for UL sync information and epoch. In a TN cell, this field is only present in ntn-NeighCellConfigList and ntn-NeighCellConfigListExt.<br>ntn-NeighCellConfigList, ntn-NeighCellConfigListExt<br>Provides a list of NTN neighbour cells including their ntn-Config, carrier frequency and PhysCellId. This set includes all elements of ntn-NeighCellConfigList and all elements of ntn-NeighCellConfigListExt. If ntn-Config is absent for an entry in ntn-NeighCellConfigListExt, the ntn-Config provided in the entry at the same position in ntn-NeighCellConfigList applies. Network provides ntn-Config for the first entry of ntn-NeighCellConfigList. If the ntn-Config is absent for any other entry in ntn-NeighCellConfigList, the ntn-Config provided in the previous entry in ntn-NeighCellConfigList applies.<br>referenceLocation<br>Reference location of the serving cell provided via NTN quasi-Earth fixed system and is used in location-based measurement initiation in RRC_IDLE and RRC_INACTIVE, as defined in TS 38.304. This field is only present in an NTN cell.<br>satSwitchWithReSync<br>Provides parameters for the target satellite required to perform satellite switch with re-synchronization. This field is only present in an NTN cell and its presence indicates that satellite switch without PCI change is supported in the cell.<br>t-Service<br>Indicates the time information on when a cell provided via NTN system is going to stop serving the area it is currently covering. This field applies for both service link switches in NTN quasi-Earth fixed system and feeder link switches for both NTN quasi-Earth fixed and Earth moving system. The field indicates a time in multiples of 10 ms after 00:00:00 on Gregorian calendar date 1 January, 1900 (midnight between Sunday, December 31, 1899 and Monday, January 1, 1900). The exact stop time is between the time indicated by the value of this field minus 1 and the time indicated by the value of this field. The reference point for t-Service is the uplink time synchronization reference point of the cell. This field is only present in an NTN cell. |

| satSwitchWithReSync field descriptions |
|---|
| ssb-TimeOffset<br>Indicates the time offset between the SSB from source and target satellite at the uplink time synchronization reference point. It is given in number of subframes.<br>t-ServiceStart<br>Indicates the time information on when the target satellite is going to start serving the area currently covered by the serving satellite. The field indicates a time in multiples of 10 ms after 00:00:00 on Gregorian calendar date $1^{st}$ January 1900 (midnight between Sunday, December 31, 1899, and Monday, January 1, 1900). The exact start time is between the time indicated by the value of this field minus 1 and the time indicated by the value of this field. |

\*\*\*\*\*\*\*\*\*\*\*\*\*\*\*\*\*\*\*\*\*\*\*\*\*\*\*\*\*\*\*\*\*\*\*\*\*\*Next Quotation\*\*\*\*\*\*\*\*\*\*\*\*\*\*\*\*\*\*\*\*\*\*\*\*\*\*\*\*\*\*\*\*\*\*\*\*\*\*

- NTN-Config
The IE NTN-Config provides parameters needed for the UE to access NR via NTN access.

| NTN-Config information element | |
|---|---|
| NTN-Config-r17 ::=<br>  epochTime-r17<br>OPTIONAL, -- Need R<br>  ntn-UlSyncValidityDuration-r17<br><br>OPTIONAL, -- Cond SIB19<br>  cellSpecificKoffset-r17<br>OPTIONAL, -- Need R<br>  kmac-r17<br>OPTIONAL, -- Need R<br>  ta-Info-r17<br>OPTIONAL, -- Need R<br>  ntn-PolarizationDL-r17<br>OPTIONAL, -- Need R | SEQUENCE {<br>  EpochTime-r17<br><br>  ENUMERATED{ s5, s10, s15, s20, s25, s30, s35,<br>    s40, s45, s50, s55, s60, s120, s180, s240, s900}<br><br>  INTEGER (1..1023)<br><br>  INTEGER (1..512)<br><br>  TA-Info-r17<br><br>  ENUMERATED {rhcp, lhcp, linear} |

-continued

```
    ntn-PolarizationUL-r17         ENUMERATED {rhcp, lhcp, linear}
OPTIONAL,    -- Need R
    ephemerisInfo-r17              EphemerisInfo-r17
OPTIONAL,    -- Need R
    ta-Report-r17                  ENUMERATED {enabled}
OPTIONAL,    -- Need R
    ...
}
EpochTime-r17 ::=                  SEQUENCE {
    sfn-r17                        INTEGER (0..1023),
    subFrameNR-r17                 INTEGER (0..9)
}
TA-Info-r17 ::=                    SEQUENCE {
    ta-Common-r17                  INTEGER (0..66485757),
    ta-CommonDrift-r17             INTEGER (-257303..257303)
OPTIONAL,    -- Need R
    ta-CommonDriftVariant-r17      INTEGER (0..28949)
OPTIONAL    -- Need R
}
```

NTN-Config field descriptions

EphemerisInfo
This field provides satellite ephemeris either in format of position and velocity state vector or in format of orbital parameters. This field is excluded when determining changes in system information, i.e. changes to ephemerisInfo should neither result in system information change notifications nor in a modification of value Tag in SIB1.
epochTime
Indicate the epoch time for the NTN assistance information. When explicitly provided through SIB, or through dedicated signaling, the EpochTime is the starting time of a DL sub-frame, indicated by a SFN and a sub-frame number signaled together with the assistance information. For serving cell, the field sfn indicates the current SFN or the next upcoming SFN after the frame where the message indicating the epoch Time is received. For neighbour cell, the sfn indicates the SFN nearest to the frame where the message indicating the epoch Time is received. The reference point for epoch time of the serving or neighbour NTN payload ephemeris and Common TA parameters is the uplink time synchronization reference point when this field is provided in an NTN cell and the gNB when this field is provided in a TN cell. If this field is absent for the serving cell, the epoch time is the end of SI window where this SIB19 is scheduled. This field is mandatory present when ntn-Config is provided in dedicated configuration. If this field is absent in ntn-Config provided via NTN-NeighCellConfig the UE uses epoch time of the serving cell, otherwise the field is based on the timing of the serving cell, i.e. the SFN and sub-frame number indicated in this field refers to the SFN and sub-frame of the serving cell. In case of handover or conditional handover, this field is based on the timing of the target cell, i.e. the SFN and sub-frame number indicated in this field refers to the SFN and sub-frame of the target cell. For the target cell the UE considers epoch time, indicated by the SFN and sub-frame number in this field, to be the frame nearest to the frame in which the message indicating the epoch time is received. This field is excluded when determining changes in system information, i.e. changes to epochTime should neither result in system information change notifications nor in a modification of value Tag in SIB1.
cellSpecificKoffset
Scheduling offset used for the timing relationships that are modified for NTN (see TS 38.213). The unit of the field K_offset is number of slots for a given subcarrier spacing of 15 kHz. If the field is absent UE assumes value 0.
kmac
Scheduling offset provided by network if downlink and uplink frame timing are not aligned at gNB. If the field is absent UE assumes value 0. In FR1, the unit of kmac is number of slots for a given subcarrier spacing of 15 kHz.
ntn-PolarizationDL
If present, this parameter indicates polarization information for downlink transmission on service link: including Right hand, Left hand circular polarizations (RHCP, LHCP) and Linear polarization.
ntn-PolarizationUL
If present, this parameter indicates Polarization information for uplink service link.
If not present and ntn-PolarizationDL is present, UE assumes the same polarization for UL and DL.
ntn-UISyncValidityDuration?
A validity duration configured by the network for assistance information (i.e. Serving and/or neighbour satellite ephemeris and Common TA parameters) which indicates the maximum time duration (from epoch Time) during which the UE can apply assistance information without having acquired new assistance information.
The unit of ntn-UISync ValidityDuration is second. Value s5 corresponds to 5 s, value s10 indicate 10 s and so on. This parameter applies to both connected and idle mode UEs. If this field is absent in ntn-Config provided via NTN-NeighCellConfig, the UE uses validity duration from the serving cell assistance information. This field is excluded when determining changes in system information, i.e. changes of ntn-UISync ValidityDuration should neither result in system information change notifications nor in a modification of value Tag in SIB1. ntn-UISyncValidityDuration is only updated when at least one of epochTime, ta-Info, ephemerisInfo is updated.
ta-Common
Network-controlled common timing advanced value and it may include any timing offset considered necessary by the network. ta-Common with value of 0 is supported. The granularity of ta-Common is $4.072 \times 10^{-48}$ (-3) μs. Values are given in unit of corresponding granularity. This field is excluded when determining changes in system information, i.e. changes of ta-Common should neither result in system information change notifications nor in a modification of value Tag in SIB1.
ta-Report

| | |
|---|---|
| When this field is included in SIB19, it indicates reporting of timing advanced is enabled during Random Access due to RRC connection establishment or RRC connection resume, and during RRC connection reestablishment. When this field is included in ServingCellConfigCommon within dedicated signalling, it indicates TA reporting is enabled during Random Access due to reconfiguration with sync (see TS 38.321, clause 5.4.8). | |
| Conditional Presence | Explanation |
| SIB19 | The field is mandatory present for the serving cell in SIB19. The field is optionally present, Need R, otherwise. |

\*\*\*\*\*\*\*\*\*\*\*\*\*\*\*\*\*\*\*\*\*\*\*\*\*\*\*\*\*\*\*\*\*\*\*\*\*\*\*\*\*Quotation End\*\*\*\*\*\*\*\*\*\*\*\*\*\*\*\*\*\*\*\*\*\*\*\*\*\*\*\*\*\*\*\*\*\*\*\*\*\*\*\*\*

The following agreements were made for satellite switching with resynchronization in 3GPP RAN2 meetings. Throughout the present disclosure, the following are interchangeable: unchanged Physical Cell Identity (PCI) mechanism, unchanged PCI (switch), PCI unchanged (switch), satellite switching/switch (without PCI changing), satellite switching/switch with unchanged PCI, satellite switch with resynchronization, and/or satellite switch with re-sync.

In the RAN2 #121b is meeting:

In quasi-earth fixed cell case, for hard satellite switch in the same Synchronization Signal Block (SSB) frequency and the same Next Generation Node B (gNB) (no key change), satellite switching without PCI changing (not requiring L3 mobility) is supported, unless major technical issues are identified by RAN1.

In the RAN2 #122 meeting:

In hard switch unchanged PCI scenario (i.e. no handover), the UE needs to know the time the UE attempts to re-synchronize.

t-Service in SIB19 can also be interpreted by Rel-18 UE in Connected mode to know that a satellite change or feeder link change happens.

In the RAN2 #123 meeting:

An explicit indication will be introduced to enable the unchanged PCI switch.

The unchanged PCI mechanism can be applied to the case where the coverage gap is zero or negligible. FFS (For Further Study) whether we need to support scenarios that require the introduction of a t-gap or t-start.

PCI unchanged procedure can be performed without performing Random Access Channel (RACH).

In the unchanged PCI case, the User Equipment (UE) considers the Uplink (UL) synchronization timer expired at t-Service (current cell stop time) to stop any UL operation.

In the unchanged PCI case, for a RACH-based solution, the UE may trigger RACH immediately after Downlink (DL) synchronizing with the new satellite.

In the RAN2 #123b is meeting:

Network provides the sync information of a target satellite in advance to the UE before satellite switching, via broadcast signaling.

RAN2 confirms satellite switching with unchanged PCI is only applicable on a quasi-earth fixed system.

Only 1 target satellite information (i.e. NTN-config) of a serving cell is provided in SIB19.

We support soft satellite switching in Rel-18.

There will be an indication whether a hard switch or soft switch is used.

At least in soft satellite switching, the network provides SSB information of the target satellite to UE.

In soft satellite switching, the UE can start synchronizing with the target satellite before T-service of source satellite.

We introduce a T-start which indicates the earliest occasion when the UE can start synchronizing with the target satellite (actual signalling is FFS). In a soft switch scenario, a T-start of the target satellite is earlier than the T-service of the source satellite.

For soft satellite switching, the exact time when the UE starts synchronizing with the target satellite (between T-start and T-service) is up to the UE implementation.

UE is not required to connect to the source satellite when the UE switches to the target satellite.

In the RAN2 #124 meeting:

Introduce one new target satellite configuration, e.g. ntn-TargetSatConfig, and provide the NTN-config of the target satellite in it for the specific signaling format about the target satellite information in SIB19. The presence of this information indicates that a satellite switch without PCI change is supported.

At least for a soft switch, there needs to be an "SSB time offset" between the source and the target satellite, "SSB time offset" is specified as a new IE, with the same format as "offset" in SSB-MTC4.

Target satellite SSB tracking is handled autonomously by the UE based on the provided SSB time offset.

The "SSB time offset" between the source and the target satellites should be provided in SIB19.

Supports implicit indication to inform the UE whether it is a hard switch or soft switch case.

For a soft satellite switch, as a baseline, it is sufficient to provide the "SSB time offset" of the target satellite in SIB19.

T-start is explicitly signaled (same format as T-service). If T-start is not signaled, T-start is assumed to be equal to T-service, i.e., hard switch.

For R18 we clarify that signaling a T-start higher than T-service is an unforeseen case and the UE will assume T-start=T-service.

During a satellite switching procedure, the UE should reset the L3 filter for serving cell Radio Resource Management (RRM) measurement and Radio Link Monitoring (RLM), and it is up to the UE implementation (i.e. no RAN2 spec impact).

If UE receives the Handover (HO) command before the UE initiates the satellite switching procedure (i.e. before the time point of satellite switching), the UE will initiate the HO procedure immediately.

Both a Conditional Handover (CHO) and a satellite switching procedure can be configured simultaneously.

When both the CHO (for a different cell) and satellite switching procedure are configured, the UE initiates the procedure that triggers earlier; it is up to the UE implementation if both procedures are triggered at the same time.

This feature will be called "satellite switch with re-sync".

A Non-Terrestrial network (NTN) could be considered as an NG-RAN consisting of Next Generation Node Bs (gNBs), which provide non-terrestrial New Radio $N_R$ access to User Equipment (UE) by means of an NTN payload embarked on an airborne or space-borne NTN vehicle and an NTN Gateway. The UE may link to, camp on, and/or connect to the NTN network that involves airborne/space-borne for transmission. The NTN may comprise various platforms, including a Low Earth Orbit (LEO) satellite, Medium Earth Orbit (MEO) satellite, Highly Elliptical Orbit (HEO) satellite, Geostationary Earth Orbit (GEO) satellite, Geostationary Synchronous Orbit (GSO) satellite, Non-Geostationary Synchronous Orbit (NGSO) satellite, and/or High Altitude Platform Station (HAPS). A LEO satellite could have an earth-fixed beam (e.g., the beam is temporarily fixed on a location during a time period) or an earth-moving beam (e.g., the beam is continuously moving along with the satellite). The NTN could offer a wide-area coverage and provide the Network (NW) access in the scenario when a Terrestrial Network (TN) is unfeasible (e.g., desert, polar area, and/or on an airplane).

The NW could provide NTN information to the UE. The NTN information may be or may be referred to as satellite (assistance) information. The NTN information may be the parameters needed for the UE to access the NW via NTN access. The NTN information may be or comprise at least NTN configuration(s) (e.g., NTN-Config), time information (e.g., t-Service), reference location(s) (e.g., referenceLocation) and distance threshold(s) (e.g., distanceThresh). The NW could provide the NTN information to the UE in an NTN-specific system information (e.g., System Information Block 19 (SIB19)) or a Radio Resource Control (RRC) message (e.g., RRCReconfiguration), e.g., via a serving cell. The NTN-specific system information may be an SIB comprising NTN information. Throughout the present disclosure, the SIB19 may be a system information for the serving cell. The SIB19 may be an NTN-specific system information. The SIB19 may contain satellite assistance information. The SIB19 may contain Uplink (UL) synchronization information for NTN. The system information may be referred to as a System Information Block.

The NTN configuration (e.g., NTN-Config) may be or comprise (at least) epoch time (e.g., epochTime), validity duration (e.g., ntn-UlSyncValidityDuration), satellite ephemeris (e.g., ephemerisInfo) and/or common Timing Advance (TA) (e.g., ta-Info). The validity duration (e.g., ntn-UlSyncValidityDuration) may indicate the maximum time during which the UE can apply the satellite information and/or NTN-specific system information (e.g., SIB19) without having acquired a new one. The validity duration (e.g., ntn-UlSyncValidityDuration), and/or epoch time (e.g., epochTime) may be associated with (or applied to) the NTN-specific system information (e.g., SIB19), NTN configuration (e.g., NTN-Config), satellite information, satellite ephemeris (e.g., ephemerisInfo), and/or common TA (e.g., ta-Info). The time information (e.g., t-Service) may be the stop serving time of the serving cell. The time information (e.g., t-Service) may be a timing when the UE would leave the coverage of the serving cell. The time information (e.g., t-Service) may indicate the time information on when the serving cell is going to stop serving the area it is currently covering.

Throughout the present disclosure, one, some, and/or all instances of "NTN configuration" may correspond to, may be supplemented with and/or may be replaced by "NTN information", "satellite information", "NTN-Config", and/or "assistance information".

The UE would use a timer (e.g., an Uplink (UL) synchronization timer) to maintain UL synchronization (e.g., for a serving cell) and/or validity of NTN information based on the NTN information. The UE would start or restart a UL synchronization timer (e.g., T430) with a validity duration (e.g., ntn-UlSyncValidityDuration) from the subframe indicated by corresponding epoch time (e.g., epochTime), wherein the validity duration (e.g., ntn-UlSyncValidityDuration) and epoch time (e.g., epochTime) are provided for the serving cell. The UE would apply the epoch time (e.g., epochTime) as the start timing of the UL synchronization timer (e.g., T430). The UE would apply the validity duration (e.g., ntn-UlSyncValidityDuration) as the length of the UL synchronization timer (e.g., T430). The UL synchronization timer (e.g., T430) may be started and/or running based on the NTN information, e.g., of a serving cell. The validity duration (e.g., ntn-UlSyncValidityDuration) and/or UL synchronization timer (e.g., T430) may indicate the time duration when the satellite information or part of the satellite information (e.g., ephemerisInfo, ta-Info) is valid. For example, when the UL synchronization timer (e.g., T430) is running, the (part of) satellite information may be considered as valid. When the UL synchronization timer (e.g., T430) is not running, the (part of) satellite information may be considered as not valid. The UL synchronization timer (e.g., T430) may indicate the time duration when the UL synchronization is obtained or maintained based on satellite information or part of the satellite information (e.g., ephemerisInfo, ta-Info). For example, when the UL synchronization timer (e.g., T430) is running, the UL may be considered as synchronized or the UL synchronization may be considered as obtained. When the UL synchronization timer (e.g., T430) is not running, the UL may be considered as not synchronized or the UL synchronization may be considered as lost.

Based on current specifications (e.g., [2] Draft 3GPP TS 38.321 V18.0.0 and [3] Draft 3GPP TS 38.331 V18.0.0), upon receiving an SIB19, the UE starts the UL synchronization timer (e.g., T430) based on the serving cell's NTN configuration. The UE stops the UL synchronization timer (e.g., T430) and then starts the UL synchronization timer (e.g., T430) in response to receiving a handover command (e.g., RRCReconfiguration with Reconfiguration WithSync). When the UE executes and/or performs the handover (or reconfiguration with sync), the UE stops the UL synchronization timer (e.g., T430). Then the UE starts the UL synchronization timer (e.g., T430) based on the target cell's NTN configuration.

The UE would reacquire the SIB19 before expiry/expiration of the UL synchronization timer. Upon expiry of the UL Synchronization timer in RRC connected mode, the UE may consider uplink synchronization is lost and acquire the SIB19. In response to acquiring the SIB19, the UE may consider uplink synchronization is obtained. If uplink synchronization is considered as lost, the UE may flush Hybrid Automatic Repeat Request (HARQ) buffers and may not perform UL transmission on the serving cell. If uplink synchronization is considered (as obtained), the UE may perform UL transmission on the serving cell. When the UL synchronization timer is running, the serving cell may be considered uplink synchronization (e.g., uplink synchronization is obtained) in RRC connected mode. When the UL synchronization timer is not running and/or expires, the serving cell may be considered not uplink synchronization (e.g., uplink synchronization is lost) in RRC connected mode.

Throughout the present disclosure, the UL synchronization timer may be a timer for a serving cell (or source cell). The UL Synchronization timer may be a UL synchronization timer for a target cell (or neighbor cell). The UL synchronization timer may be a validity timer. The UL synchronization timer may be the timer T430. The UL synchronization timer may be used to maintain/evaluate UL synchronization, e.g., when the UE is in NTN, when the UE is connected to a satellite. The UL synchronization timer may indicate/handle the time duration when the (associated) assistance information is valid. The UL synchronization timer may indicate/handle the time duration when the UE can apply the (associated) satellite information, e.g., without acquiring new satellite information. The UL synchronization timer may be used in NTN. The UL synchronization timer (e.g., T430) may not be used in TN. The UL synchronization timer (e.g., T430) may be an NTN-specific timer. The UL synchronization timer may be different from a TA timer (e.g., TimeAlignmentTimer). The UL synchronization timer may not be used to maintain UL TA. The UL synchronization timer may be associated to a cell. The UL synchronization timer may not be associated to a TA group. The UE may consider UL is synchronized when the (associated) satellite information is valid.

In NTN, the NW on the ground that serves a UE may be unchanged while the satellite in between the UE and the NW on the ground may change, due to satellite switching or satellite moving. To prevent L3 mobility such as a handover caused by the satellite switch, in order to reduce the signaling overhead and/or interruption time, a mechanism of the satellite switch with resynchronization would be supported in NTN. The satellite switch mechanism avoids mobility for UEs in the cell by maintaining the same Physical Cell Identity (PCI) on the geographical area. The satellite switch with resynchronization may be or may be referred to as satellite switching without PCI changing and/or an unchanged PCI switch. The satellite switch with resynchronization may be or may be referred to as a mechanism without L3 mobility, e.g., handover. The UE could keep the cell configuration when the satellite switches without changing gNB. The signaling such as a Handover (HO) command could be reduced. The UE should not trigger an RRC reconfiguration procedure. The UE may perform re-synchronization to the serving cell since the satellite ephemeris (e.g., ephemerisInfo) and/or common the TA (e.g., ta-Info) may be different. The UE may perform Downlink (DL) and/or UL synchronization to the serving cell. The UE may (re)-acquire the SIB19. In satellite switching with resynchronization, the UE may switch/change the serving satellite without performing handover, without receiving an RRC (re) configuration, without changing the PCI of the serving cell, and/or without changing the serving gNB.

Figure 9:
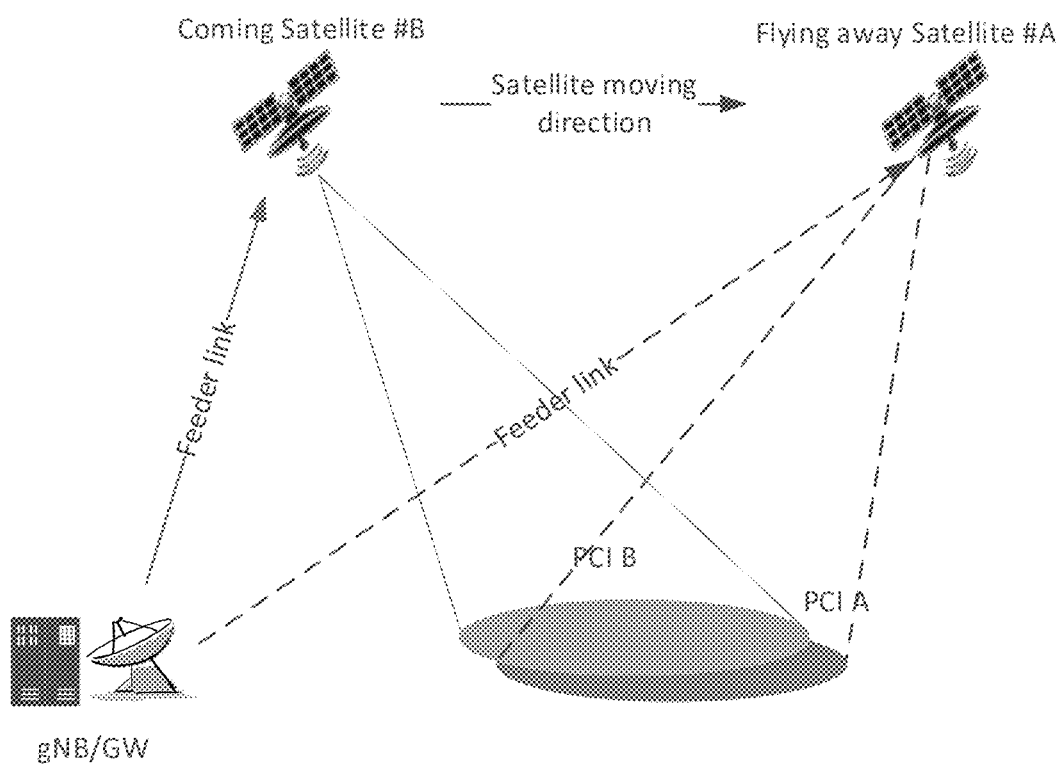
FIG. 9 is an example diagram of an unchanged PCI switch, in accordance with embodiments of the present invention.

Throughout the present disclosure, the satellite switch with resynchronization may be (replaced by/equivalent to) a procedure of an unchanged PCI switch, cell switch with resynchronization, satSwitchWithResync, cell switch with unchanged PCI, hard/soft satellite switch, satellite switch without PCI change, re-synchronization, or the like, and/or any combination of the above. An example of an unchanged PCI switch is shown in FIG. 9 (quoted from [4] R2-2308373).

The UE may be indicated (by a network node) to perform (or initiate) a satellite switch with resynchronization, e.g., via a system information (e.g., SIB19). The UE may receive a configuration (or indication) of satellite switch with resynchronization. The configuration (or indication) of satellite switch with resynchronization may indicate the UE to perform (or initiate) the satellite switch with resynchronization (e.g., at a specific timing such as t-Service). The configuration may be included in the system information (e.g., SIB19). The configuration (or indication) may be satSwitchWithResync. The configuration (or indication) may be included in satSwitchWithResync. Throughout the present disclosure, the satSwitchWithResync may be an indication of the (enabling/triggering) satellite switch with resynchronization.

The UE may perform (or initiate) the satellite switch with resynchronization, e.g., in response to (receiving) the indication (or configuration) of satellite switch with resynchronization. The UE may perform (or initiate) the satellite switch with resynchronization, e.g., at a specific time, at t-Service, before t-Service, after t-Service, after t-Start. The specific time may be indicated by the network node. The specific time may be indicated in system information (e.g., SIB19). The specific time may be a second timing. The specific time may be (or indicate) a cell stop time (e.g., t-Service). The specific time may be (or indicate) a switch start time (e.g., t-Start). The cell stop time (e.g., t-Service) may be (or indicate) when a cell provided via the NTN is going to stop serving the area it is currently covering. The switch start time (e.g., t-Start) may be (or indicate) when a second satellite is going to serve the area (or cell) a first satellite is currently covering or serving. The switch start time (e.g., t-ServiceStart) may be (or indicate) when the satellite switch with resynchronization could be started or performed. Throughout the present disclosure, the t-ServiceStart may be a satellite switch start time and the t-Service may be a cell (serving) stop time. Throughout the present disclosure, the t-ServiceStart may be represented by t-Service minus t-Gap.

In response to the satellite switch with resynchronization (e.g., if receiving the indication of the satellite switch with resynchronization, during the satellite switch with resynchronization, upon initiation of the satellite switch with resynchronization, when the satellite switch with resynchronization is initiated, and/or if the satellite switch with resynchronization is initiated, at a cell stop time such as t-Service), the UE may or may not:

Consider a UL synchronization timer (e.g., T430) as expired;

Stop the UL synchronization timer (e.g., T430);

Start timer T430 with the timer value set to ntn-UlSyncValidityDuration from the subframe indicated by epochTime (in ntn-Config) in SatSwitchWithReSync;

Stop to use UE specific Koffset, if configured, e.g., after a cell stop time (e.g., t-Service), and/or until receiving a new differential Koffset (e.g., Medium Access Control (MAC) Control Element (CE));

Use cell specific Koffset, e.g., after a cell stop time (e.g., t-Service), and/or until receiving a new differential Koffset (e.g., MAC CE);

Perform DL (re) synchronization with the serving cell (or NW);

Start re-synchronizing to the DL of a Special Cell (SpCell) served by a satellite indicated (in ntn-Config) in SatSwitchWithReSync;

(re) Acquire SIB19 (and/or SIB1, SIB2);

(re) Acquire NTN related configuration (e.g., ephemeris) (e.g., of the serving cell, included in SIB19);

Trigger a Random Access (RA) procedure;

Perform UL synchronization with the serving cell (or the NW);

Inform lower layers that UL synchronization is lost due to satellite switch with re-synchronization; and/or Inform lower layers when UL synchronization is obtained.

The satellite switch with resynchronization may be or may comprise soft satellite switching and/or hard satellite switching. Throughout the present disclosure, the "soft satellite switching" may be "soft satellite switching with resynchronization". Throughout the present disclosure, the "hard satellite switching" may be "hard satellite switching with resynchronization". The soft satellite switching or hard satellite switching may be indicated by the NW. The NW may provide an indication of a satellite switching type (e.g., soft satellite switching or hard satellite switching). The NW may provide t-ServiceStart and/or Synchronization Signal Block (SSB) information of soft satellite switching. The indication may be a parameter, t-ServiceStart, and/or SSB information.

Figure 10:
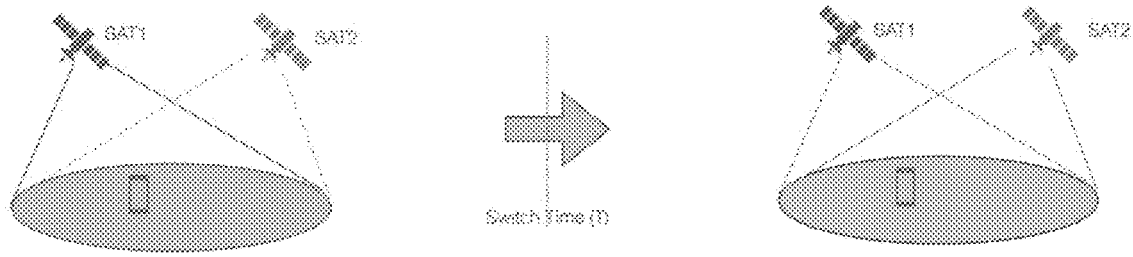
FIG. 10 is an example diagram of hard satellite switching, in accordance with embodiments of the present invention.

For hard satellite switching, the UE may connect to (or synchronize with) the new satellite (e.g., the target satellite, the second satellite) after disconnecting from the old satellite (e.g., the source satellite, the first satellite). An example of hard satellite switching is shown in FIG. 10 (quoted from [5] R2-2310307). The serving satellite may be switched at a time point (e.g., switch time in FIG. 10, t-Service). A first satellite (e.g., STA1 in FIG. 10) may be the serving satellite before the satellite switching and/or the time point. A second satellite (e.g., STA2 in FIG. 10) may be the serving satellite after the satellite switching and/or the time point. The first satellite and the second satellite may serve the same cell (e.g., with the same PCI). The first satellite may be a source satellite. The second satellite may be a target satellite.

Figure 11:
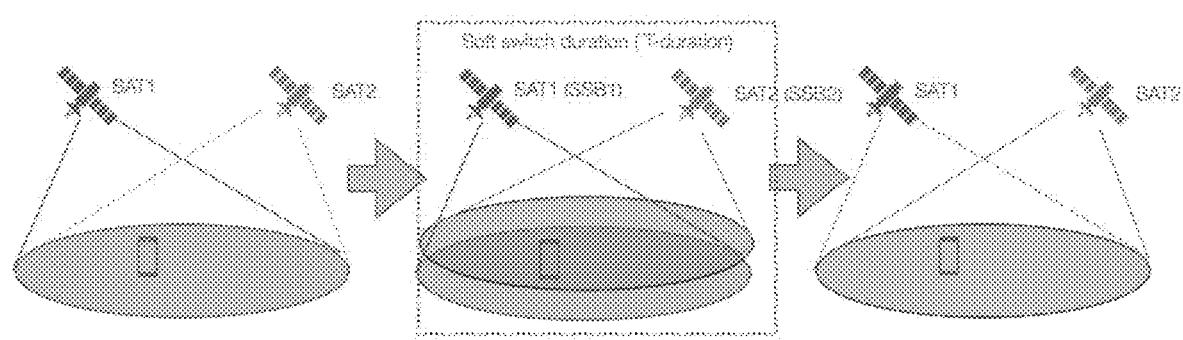
FIG. 11 is an example diagram of soft satellite switching, in accordance with embodiments of the present invention.

For soft satellite switching, the UE may connect to (or synchronize with) the new satellite (e.g., the target satellite, the second satellite) before disconnecting to the old satellite (e.g., the source satellite, the first satellite). An example of soft satellite switching is shown in FIG. 11 (quoted from [5] R2-2310307). The serving satellite may be switched during a time duration (e.g., T-duration in FIG. 11, between t-ServiceStart and t-Service). Both the first satellite (e.g., STA1 in FIG. 11) and the second satellite (e.g., STA2 in FIG. 11) provide service/coverage for the same area during the time duration. The time duration may start from t-ServiceStart and end at t-Service. The first satellite may be the serving satellite before satellite switching and/or t-ServiceStart. The second satellite (e.g., STA2 in FIG. 11) may be the serving satellite after the satellite switching and/or t-Service. The first satellite and the second satellite may serve the same cell (e.g., with the same PCI). The first satellite may be a source satellite. The second satellite may be a target satellite.

Throughout the present disclosure, the satellite switch with resynchronization may be, may be referred to, may be replaced by, and/or may comprise a hard satellite switch with resynchronization and/or a soft satellite switch with resynchronization.

Figure 12:
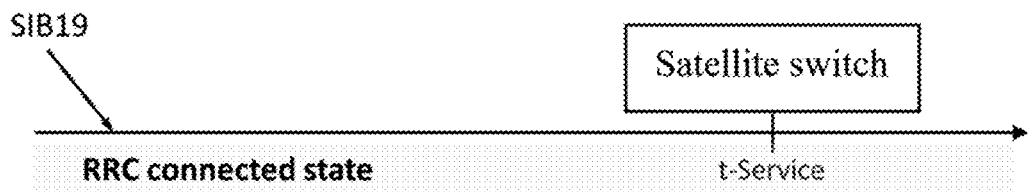
FIG. 12 is an example diagram of a satellite switch, in accordance with embodiments of the present invention.
Figure 13:
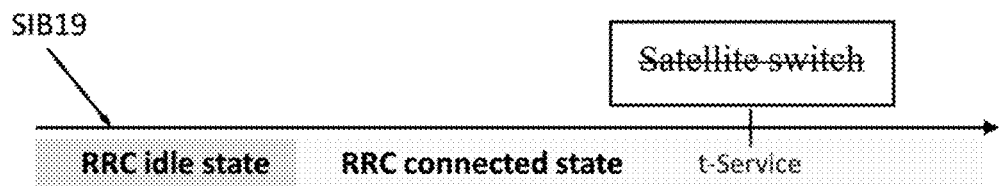
FIG. 13 is an example diagram of an issue for a satellite switch, in accordance with embodiments of the present invention.

Based on the current $N_R$ RRC specification ([3] TS 38.331 v18.0.0), the UE performs the actions upon reception of an SIB19 (as specified in section 5.2.2.4.21 of TS 38.331 ([3] Draft 3GPP TS 38.331 V18.0.0)) when the UE is in RRC_CONNECTED, including the check of SatSwitchWithReSync in the SIB19 in order to determine whether to perform a satellite switch with resynchronization. In other words, based on current $N_R$ RRC specification, the UE determines whether to perform the satellite switch with re-synchronization at the timing when the UE receives an SIB19 (e.g., at a first timing). The UE determines whether to perform the satellite switch with resynchronization based on the RRC state of the UE at the timing of the SIB19 reception (e.g., the first timing) if SatSwitchWithResync and t-Service are included in the SIB19 and the UE supports the satellite switch with resynchronization. That is to say, the satellite switch with resynchronization is performed only when the UE is in RRC_CONNECTED at the timing of receiving the SIB19 (e.g., the first timing). An example is shown in FIG. 12, wherein the UE receives the SIB19 at a first timing in RRC_CONNECTED and initiates a satellite switch at a second timing in RRC_CONNECTED. However, the UE could be in RRC_IDLE (or RRC_INACTIVE) state when it receives an SIB19, e.g., at the first timing. If the UE is in RRC_IDLE or RRC_INACTIVE state at the timing of receiving the SIB19 (e.g., the first timing), the UE would not perform a satellite switch with resynchronization even if SatSwitchWithReSync and t-Service are included in the SIB19 and the UE is in RRC_CONNECTED at t-Service (e.g., the second timing). The UE may enter RRC_CONNECTED after receiving the SIB19 and the UE may be in RRC_CONNECTED at the time indicated by t-Service (or between the time indicated by t-ServiceStart and the time indicated by t-Service). In this case, based on the current specification, the UE does not perform the action (to perform a satellite switch with resynchronization) since it is not in RRC_CONNECTED state at the time of the SIB19 reception. The UE may determine not to initiate the satellite switch with resynchronization upon the UE receiving the SIB19 in RRC_IDLE or RRC_INACTIVE state (e.g., at the first timing). An example for the issue is shown in FIG. 13.

For example, accordingly to current specification, the UE may receive an SIB19 from a serving cell at a first timing, wherein the UE is in RRC_IDLE state at the first timing. The SIB19 may include at least ntn-Config (providing an NTN configuration for the serving cell and/or neighbor cell(s)), satSwitchWithResync (indicating the satellite switch is supported in the serving cell) and t-Service (indicating when the serving cell is going to stop serving the area it is currently covering). After receiving the SIB19, the UE may perform an initial access (e.g., RRC connection establishment procedure) to the serving cell at a second timing. The UE may enter RRC_CONNECTED state at/after the second timing. After the UE enters RRC_CONNECTED state, the serving satellite may be switched at a third timing indicated by the t-Service. The UE may not perform a satellite switch with resynchronization at or before the third timing, since the UE is not in RRC_CONNECTED state upon receiving the SIB19. The serving satellite would be changed, but the UE would not perform resynchronization. The UE may lose coverage of the serving satellite at/after the third timing.

On the other hand, the UE may be in RRC_CONNECTED when the UE receives the SIB19. Based on the current $N_R$ RRC specification, the UE performs the actions upon reception of the SIB19 (as specified in section 5.2.2.4.21 of [3] Draft 3GPP TS 38.331 V18.0.0) when the UE is in RRC_CONNECTED, and the UE may determine to perform a satellite switch with resynchronization at the time indicated by t-Service (or between the time indicated by t-ServiceStart and the time indicated by t-Service). However, the UE may leave RRC_CONNECTED (and/or enter RRC_IDLE or RRC_INACTIVE) before the time indicated by t-Service (or between the time indicated by t-ServiceStart and the time indicated by t-Service). In this case, based on the current specification, the UE still performs the satellite switch with resynchronization when the UE is in RRC_IDLE (or RRC_INACTIVE).

Moreover, based on the agreements in RAN2 meetings, the UE should perform Conditional Handover (CHO)/handover or a satellite switch with resynchronization which triggers earlier. According to the current specification, the UE may perform a satellite switch with resynchronization regardless of whether there is a triggered/initiated/on-going CHO/handover procedure. The UE may trigger a CHO/handover procedure and then still perform a satellite switch with resynchronization.

To solve the issue, the UE could determine whether to perform/initiate a satellite switch with resynchronization, based on one or more conditions at one or more specific timings. The specific timing may comprise a first timing and/or a second timing. The one or more conditions may be associated with the first timing or the second timing.

The UE could make a determination to perform/initiate a satellite switch with resynchronization at the second timing based on the one or more conditions. The UE may perform a satellite switch with resynchronization at the second timing based on (or if) the one or more conditions being fulfilled. The UE may not perform/initiate a satellite switch with resynchronization at the second timing based on (or if) the one or more conditions not being fulfilled.

The UE could determine whether to perform/initiate a satellite switch with resynchronization based on the RRC state of the UE at one or more specific timings. The RRC state of the UE may be or comprise RRC idle state, RRC inactive state, and/or RRC connected state. Throughout the present disclosure, the following are interchangeable: RRC idle state, RRC idle mode, and RRC_IDLE (state/mode). Throughout the present disclosure, the following are interchangeable: RRC inactive state, RRC inactive mode, and RRC_INACTIVE (state/mode). Throughout the present disclosure, the following are interchangeable: RRC connected state, RRC connected mode, and RRC_CONNECTED (state/mode).

The UE could determine whether to perform/initiate a satellite switch with resynchronization based on whether a timer is running at the second timing. The timer may be a related handover, CHO, and/or reconfiguration with sync. The timer may be a failure timer for handover, CHO, and/or reconfiguration with sync. The timer may be started in response to triggering/initiating/performing a procedure of handover, CHO, and/or reconfiguration with sync. The timer may be stopped in response to completing the procedure of handover, CHO, and/or reconfiguration with sync. The UE may consider the procedure of handover, CHO, and/or reconfiguration with sync is running when the timer is running. The timer may be T304.

The first timing may be the time when/upon the UE receives a system information. The system information may be an NTN-specific system information. The system information may be SIB19. The system information may comprise one or more NTN configurations (e.g., NTN-Config). The system information may comprise an NTN configuration (e.g., NTN-Config) for a serving cell of a serving satellite. The system information may comprise an NTN configuration (e.g., NTN-Config) for a serving cell or a neighbor cell of a target satellite. The system information may comprise an NTN configuration (e.g., NTN-Config) for a target cell of a serving satellite or a target satellite. The system information may comprise a serving stop time of the serving cell (e.g., t-Service). The system information may comprise an indication/configuration of a satellite switch with resynchronization (e.g., SatSwitchWithReSync). The system information may or may not comprise the serving start time of a target satellite (e.g., t-ServiceStart). The serving start time of the target satellite (e.g., t-ServiceStart) may be before the stop time of the serving cell (e.g., t-Service).

The second timing may be the time indicated by the network. The second timing may be the time indicated by the serving stop time of the serving cell (e.g., t-Service). The second timing may be the time indicated by the serving stop time of the serving cell (e.g., t-Service) and the serving start time of the target satellite (e.g., t-ServiceStart). The second timing may be the serving stop time of the serving cell (e.g., t-Service). The second timing may be a time between the time indicated by the serving start time of the target satellite (e.g., t-ServiceStart) and the time indicated by the serving stop time of the serving cell (e.g., t-Service). The second timing may be the time when the UE determines to perform the satellite switch with resynchronization. The second timing may be the time when the UE is in RRC_CONNECTED. The second timing may be the time when or after the UE enters RRC_CONNECTED.

The UE may receive a system information (e.g., SIB19) at the first timing, and determine whether to perform/initiate a satellite switch with resynchronization at the second timing, based on the one or more conditions.

The one or more conditions may be one or more of (or a combination of) the following:

The UE is in RRC connected state at the second timing, e.g., regardless of which RRC state the UE is in at the first timing;

The UE is in any of the RRC states at the first timing;

The indication of a satellite switch with resynchronization (e.g., satSwitchWithReSync) is included in the system information;

The serving stop time of the serving cell (e.g., t-Service) is included in the system information;

The UE supports a satellite switch with resynchronization; and/or

The timer (e.g., T304) is not running, e.g., at the second timing.

The UE may determine to perform/initiate a satellite switch with resynchronization not based on whether the UE is in RRC connected state at a first timing (e.g., upon receiving an SIB19). The UE may determine to perform a satellite switch with resynchronization based on (or if) the UE being in any of the RRC idle states, RRC inactive states, and RRC connected states at the first timing (e.g., upon receiving an SIB19). The UE may determine to perform/initiate a satellite switch with resynchronization regardless of whether the UE is in RRC idle state, RRC inactive state, or RRC connected state at the first timing (e.g., upon receiving an SIB19). The UE may determine to perform a satellite switch with resynchronization regardless of the RRC state of the UE at the first timing (e.g., upon receiving an SIB19).

The UE may determine to perform/initiate a satellite switch with resynchronization based on whether (or if) the UE is in RRC connected state at a second timing (e.g., indicated by t-Service and/or t-ServiceStart). The UE may determine to perform/initiate a satellite switch with resynchronization based on whether (or if) the UE is in RRC connected state at the second timing (e.g., indicated by t-Service and/or t-ServiceStart) regardless of the RRC state of the UE at the first timing (e.g., upon receiving an SIB19). The UE may determine not to perform/initiate a satellite switch with resynchronization based on whether (or if) the UE is not in RRC connected state at the second timing (e.g., indicated by t-Service and/or t-ServiceStart). The UE may determine not to perform/initiate a satellite switch with resynchronization based on whether (or if) the UE is in RRC idle/inactive state at the second timing (e.g., indicated by t-Service and/or t-ServiceStart).

The UE may determine to perform/initiate a satellite switch with resynchronization based on whether (or if) the UE receives an SIB19 including satSwitchWithReSync. The UE may determine to perform/initiate a satellite switch with resynchronization based on whether (or if) the UE receives an SIB19 including t-Service. The UE may determine to perform/initiate a satellite switch with resynchronization based on whether (or if) the UE receives an SIB19 including t-ServiceStart. The UE may determine not to perform/initiate satellite a switch with resynchronization based on whether (or if) the UE receives an SIB19 not including satSwitchWithReSync. The UE may determine not to perform/initiate a satellite switch with resynchronization based on whether (or if) the UE receives an SIB19 not including t-Service.

The UE may determine to perform/initiate a satellite switch with resynchronization based on whether (or if) the UE supports a satellite switch with resynchronization. The UE may determine to perform/initiate a satellite switch with resynchronization based on whether (or if) the UE supports a hard satellite switch with resynchronization and satSwitchWithReSync and t-Service are included in the received SIB19. The UE may determine to perform/initiate a satellite switch with resynchronization based on whether (or if) the UE supports a soft satellite switch with resynchronization and satSwitchWithReSync, t-Service, and t-ServiceStart are included in the received SIB19. The UE may determine not to perform/initiate a satellite switch with resynchronization based on whether (or if) the UE does not support a satellite switch with resynchronization.

The UE may determine to perform/initiate a satellite switch with resynchronization based on whether (or if) T304 is not running at the second timing (e.g., indicated by t-Service and/or t-ServiceStart). The UE may determine not to perform/initiate a satellite switch with resynchronization based on whether (or if) T304 is running at the second timing (e.g., indicated by t-Service and/or t-ServiceStart).

The UE may not acquire (or receive) SIB19 when the UE is in RRC_CONNECTED. The UE may not acquire (or receive) SIB19 after the UE enters RRC_CONNECTED. The UE may not acquire (or receive) SIB19 between the first timing and the second timing. The UE may not acquire (or receive) SIB19 between the time the UE enters RRC_CONNECTED and the second timing.

A timer T430 of the UE may be running (or the T430 expiry may not occur) when the UE is in RRC_CONNECTED. The T430 of the UE may be running (or the T430 expiry may not occur) after the UE enters RRC_CONNECTED. The T430 of the UE may be running (or the T430 expiry may not occur) between the first timing and the second timing. The T430 of the UE may be running (or the T430 expiry may not occur) between the time the UE enters RRC_CONNECTED and the second timing.

One or more of above embodiment(s), concept(s), method(s), example(s), behavior(s), event(s), and/or condition(s) for determination could be combined.

Figure 14:
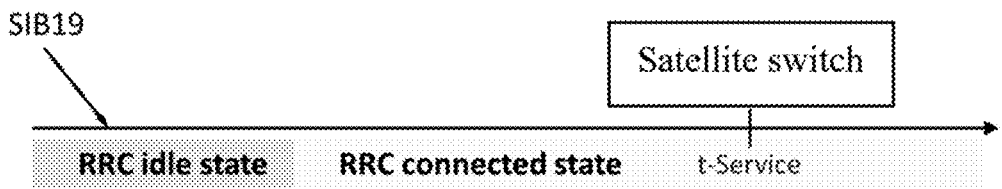
FIG. 14 is an example diagram of satellite switching, in accordance with embodiments of the present invention.

To solve the issue(s), the UE could determine to perform/initiate a satellite switch with resynchronization (at the timing when the UE is in RRC_CONNECTED), based on (at least) SatSwitchWithResync and t-Service are included in an SIB19, not only in the case of the UE being in RRC_CONNECTED (as shown in FIG. 12) but also in the case of the UE being in RRC_IDLE (or RRC_INACTIVE) (as shown in FIG. 14) at the time of receiving the SIB19.

An example for the present invention is shown in FIG. 14. The UE may receive an SIB19 at a first timing, wherein the UE is in RRC_IDLE or RRC_INACTIVE at the first timing. The first timing may be a timing when the UE receives the SIB19. The UE may enter (or transit to) RRC_CONNECTED from RRC_IDLE or RRC_INACTIVE, e.g., after receiving the SIB19. The UE may initiate an initial access (procedure), RRC connection establishment (procedure), and/or RRC connection resume (procedure), e.g., after receiving the SIB19. In response to initiating the initial access (procedure), an RRC connection establishment (procedure) and/or an RRC connection resume (procedure), the UE may enter RRC_CONNECTED. The UE may determine to initiate a satellite switch with resynchronization at a second timing when the UE is in RRC_CONNECTED, based on (at least) SatSwitchWithResync and t-Service are included in the SIB19. The second timing may be a timing when the UE is in RRC_CONNECTED and/or a timing indicated by t-Service. The second timing may be a timing when the UE determines to initiate a satellite switch with resynchronization.

The UE may be in any of RRC_CONNECTED, RRC_IDLE, or RRC_INACTIVE at the first timing when receiving the SIB19. The UE may determine to initiate the satellite switch with resynchronization at the second timing, when the UE is in any RRC state at the first timing. The UE may determine to initiate the satellite switch with resynchronization at the second timing, regardless of the RRC state of the UE at the first timing. The UE may determine to initiate the satellite switch with resynchronization based on the RRC state of the UE at the second timing. The UE may determine to initiate the satellite switch with resynchronization not based on the RRC state of the UE at the first timing. The second timing may be different from the first timing. The second timing may be later than the first timing.

In response to initiating the satellite switch with resynchronization, the UE may perform (at least) one or more of the following actions (which may be in sequence):

Stopping a timer T430, if running;
Informing lower layers that UL synchronization is lost due to the satellite switch with resynchronization;
Synchronizing to DL of a SpCell served by a satellite indicated by SatSwitchWithReSync;
Starting the timer T430 with a timer value set to ntn-UlSyncValidityDuration from a subframe indicated by epochTime in SatSwitchWithReSync; and/or
Informing lower layers when UL synchronization is obtained.

In one or more examples, the UE receives an SIB19 at a first timing and the SIB19 includes a t-Service indicating a second timing.

In one or more examples, the UE is in RRC idle (and/or RRC inactive) state at the first timing and the second timing. The UE does not perform/initiate a satellite switch with resynchronization at the second timing, e.g., based on the UE is not in RRC connected state at the second timing. The UE may perform/initiate an initial access or an RRC resumption after the second timing.

In one or more examples, the UE is in RRC idle (and/or RRC inactive) state at the first timing and is in RRC connected state at the second timing. The UE performs initial access or RRC resumption after the first timing and before the second timing. The UE performs the satellite switch with resynchronization at the second timing, e.g., based on the UE is in RRC connected state at the second timing.

In one or more examples, the UE is in RRC connected state at the first timing and the second timing. The UE may perform/initiate an initial access or an RRC resumption before the first timing. The UE performs the satellite switch with resynchronization at the second timing, e.g., based on the UE is in RRC connected state at the second timing.

In one or more examples, the UE is in RRC connected state at the first timing and is in RRC idle (and/or RRC inactive) state at the second timing. The UE performs an RRC release after the first timing and before the second timing. The UE does not perform/initiate a satellite switch with resynchronization at the second timing, e.g., based on the UE is not in RRC connected state at the second timing.

Examples of text proposals on top of the current specification are provided in FIGS. 15-21.

In FIG. 15, the UE determines whether to perform/initiate the satellite switch with resynchronization regardless of the RRC state when/upon the UE receives SIB19.

In FIGS. 16-18, the UE determines whether to perform/initiate the satellite switch with resynchronization based on the UE is in RRC_CONNECTED state at the time indicated by t-Service, after the time indicated by t-ServiceStart, or between the time indicated by t-ServiceStart and the time indicated by t-Service, regardless of the RRC state when/upon the UE receives SIB19.

In FIGS. 19-21, the UE determines whether to perform/initiate the satellite switch with resynchronization based on the UE is in RRC_CONNECTED state and the timer T304 is not running at the time indicated by t-Service, after the time indicated by t-ServiceStart, or between the time indicated by t-ServiceStart and the time indicated by t-Service, regardless of the RRC state when/upon the UE receives SIB19.

The UE may receive configurations related to NTN (e.g., SIB19, NTN-Config).

The UE may be in a cell of an NTN. The UE may be connected to a cell of an NTN. The UE may camp on a cell of an NTN. The UE may be connected to a LEO, GEO, MEO, HEO, and/or HAPS. The UE may be connected to one or two networks (nodes).

The UE may be referred to as the UE, an RRC layer of the UE, a MAC entity of the UE, or a physical layer of the UE.

The UE may be an $N_R$ device. The UE may be a Long Term Evolution (LTE) device. The UE may be a Narrowband Internet of Things (NB-IoT) device. The UE may be an enhanced Machine-Type Communication (eMTC) device. The UE may be a reduced capability device. The UE may be a mobile phone. The UE may be a wearable device. The UE may be a sensor. The UE may be a stationary device. The UE may be an (unmanned) aerial vehicle.

The network may be a network node. The network may be a base station. The network may be an access point. The network may be an Evolved Node B (eNB). The network may be a gNB. The network may be a gateway.

Various examples and embodiments of the present invention are described below. For the methods, alternatives, concepts, examples, and embodiments detailed above and herein, the following aspects and embodiments are possible.

Figure 22:
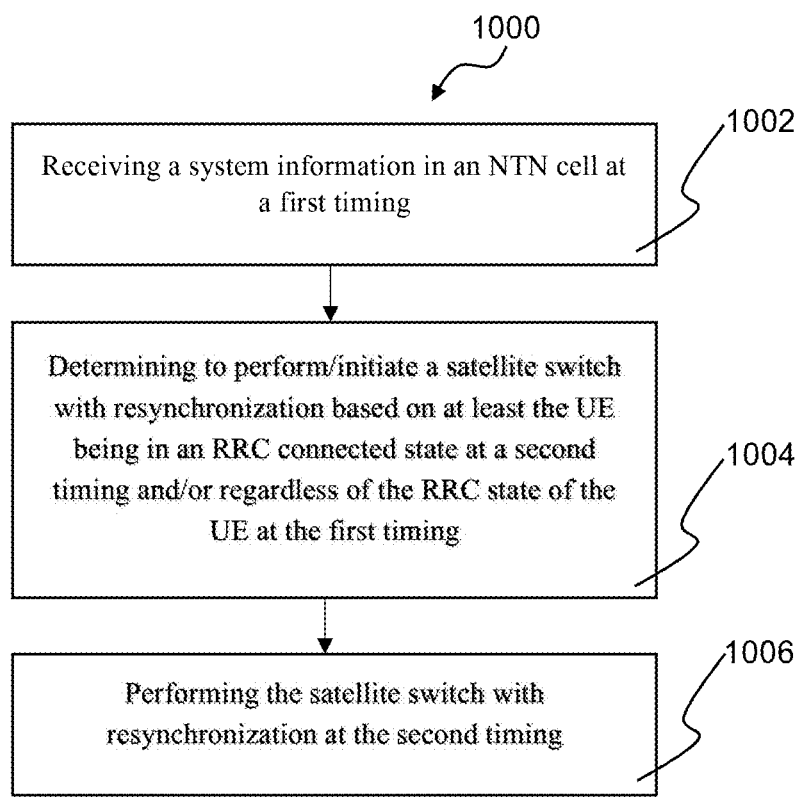
FIG. 22 is a flow diagram of a method of a UE in a wireless communication system comprising receiving a system information in an NTN cell at a first timing, determining to perform/initiate a satellite switch with resynchronization based on at least the UE being in an RRC connected state at a second timing and/or regardless of the RRC state of the UE at the first timing, and performing the satellite switch with resynchronization at the second timing, in accordance with embodiments of the present invention.

Referring to FIG. 22, with this and other concepts, systems, and methods of the present invention, a method 1000 for a first UE in a wireless communication system comprises receiving a system information in an NTN cell at a first timing (step 1002), determining to perform/initiate a satellite switch with resynchronization based on at least the UE being in an RRC connected state at a second timing and/or regardless of the RRC state of the UE at the first timing (step 1004), and performing the satellite switch with resynchronization at the second timing (step 1006).

In various embodiments, the system information is SIB19.

In various embodiments, the first timing is the time when the UE receives the system information.

In various embodiments, the second timing is the time indicated by t-Service, or between the time indicated by t-ServiceStart and the time indicated by t-Serving.

In various embodiments, t-Service is a time information on when a cell is going to stop serving, or is cell (serving) stop time.

In various embodiments, t-ServiceStart is a time information on when a satellite is going to start serving, or is satellite switch start time.

In various embodiments, t-Service and/or t-ServiceStart is included in the system information.

In various embodiments, the method further comprises determining to perform/initiate the satellite switch with resynchronization based on: satSwitchWithReSync is included in the system information, t-Service is included in the system information, the UE supports the satellite switch with resynchronization, and/or a timer is not running.

In various embodiments, the timer is T304.

In various embodiments, the satellite switch with resynchronization is a hard satellite switch with resynchronization and/or a soft satellite switch with resynchronization.

In various embodiments, the UE is in an RRC idle state or an RRC inactive state at the first timing.

In various embodiments, the method further comprises performing an initial access or RRC resume, after the first timing and before the second timing.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive a system information in an NTN cell at a first timing; (ii) determine to perform/initiate a satellite switch with resynchronization based on at least the UE being in an RRC connected state at a second timing and/or regardless of the RRC state of the UE at the first timing; and (iii) perform the satellite switch with resynchronization at the second timing. Moreover, the CPU 308 can execute the program code 312 to perform all of the described actions, steps, and methods described above, below, or otherwise herein.

Referring back to FIGS. 3 and 4, in one or more embodiments from the perspective of a NW in a wireless communication system, the device 300 includes a program code 312 stored in memory 310 of the transmitter. The CPU 308 could execute program code 312 to: (i) transmit a system information in an NTN cell at a first timing; and (ii) perform, at the UE, a satellite switch with resynchronization at a second timing, wherein the UE is in an RRC connected state at the second timing and/or regardless of the RRC state of the UE at the first timing. Moreover, the CPU 308 can execute the program code 312 to perform all of the described actions, steps, and methods described above, below, or otherwise herein.

The one or more conditions may be one or more of (or a combination of) the following:

The UE is in RRC connected state at the second timing, e.g., regardless of which RRC state the UE is in at the first timing the UE;

The UE is in RRC idle/inactive state at the second timing, e.g., regardless of which RRC state the UE is in at the first timing the UE;

The UE is in any of the RRC states at the first timing;

The indication of the satellite switch with resynchronization (e.g., satSwitchWithReSync) is included in the system information;

The serving stop time of the serving cell (e.g., t-Service) is included in the system information;

The UE supports the satellite switch with resynchronization; and/or

The timer (e.g., T304) is not running, e.g., at the second timing.

Alternatively and/or additionally, the UE could determine (whether) to perform/initiate (at least) a first action and/or not perform/initiate (at least) a second action, based on one or more conditions at the one or more specific timings. The UE could make a determination to perform/initiate (at least) the first action and/or not perform/initiate (at least) the second action at the second timing based on (at least) the one or more conditions. The UE may perform/initiate (at least) the first action at the second timing based on (or if) (at least) the one or more conditions being fulfilled. The UE may not perform/initiate (at least) the first action at the second timing based on (or if) (at least) the one or more conditions not being fulfilled. The UE may not perform/initiate (at least) the second action at the second timing based on (or if) (at least) the one or more conditions being fulfilled. The UE may not perform/initiate (at least) the second action at the second timing based on (or if) (at least) the one or more conditions not being fulfilled. The UE could determine (whether) to perform/initiate (at least) the first action and/or second action based on (at least) the RRC state of the UE at the one or more specific timings. The UE could determine (whether) to perform/initiate (at least) the first action and/or second action based on (at least) whether the timer is running at the second timing.

Throughout the present disclosure, the performing satellite switch with resynchronization may comprise the first action and the second action. The performing satellite switch with resynchronization may comprise the first action and not comprise the second action. The UE may perform/initiate the first action during a procedure of a satellite switch with resynchronization. The UE may perform/initiate the second action during a procedure of a satellite switch with resynchronization. The UE may not perform/initiate the second action during a procedure of satellite switch with resynchronization. The first action and the second action may be different.

The first action and/or the second action may be one or a combination of the following:

Handle or maintains the UL synchronization timer (e.g., T430):
  stop the UL synchronization timer (e.g., T430), e.g., if it is running; and/or
  start the UL synchronization timer (e.g., T430), e.g., with the timer value set to ntn-UlSyncValidityDuration from the subframe indicated by epochTime.

Perform UL synchronization:
  consider UL synchronization is lost and/or obtained;
  inform lower layers that UL synchronization is lost, e.g., due to the satellite switch with re-synchronization;
  inform lower layers when UL synchronization is obtained;
  flush (all) HARQ buffer(s);
  suspend/resume the uplink transmission, e.g., on the serving cell;
  set Network Use Timing Advance (NTA) value to zero, e.g., for Primary Timing Advance Group (PTAG); and/or
  indicate to the lower layers a differential Koffset with value zero.

Perform DL (re) synchronization:
  start (re-)synchronizing to the DL of the SpCell (e.g., served by target satellite indicated by SatSwitchWithReSync);
  apply Broadcast Control Channel (BCCH) configuration for the SpCell (e.g., served by target satellite indicated by SatSwitchWithReSync); and/or
  acquire Master Information Block (MIB) of the target SpCell (e.g., served by target satellite indicated by SatSwitchWithReSync).

Acquire the NTN-specific system information (e.g., SIB19).

In one or more examples, the UE receives an SIB19 at a first timing and the SIB19 includes a t-Service indicating a second timing.

In one or more examples, the UE is in an RRC idle (and/or RRC inactive) state at the first timing and the second timing. The UE does not perform/initiate a satellite switch with resynchronization at the second timing, e.g., based on the UE is not in an RRC connected state at the second timing. The UE does not perform/initiate a satellite switch with resynchronization comprising DL (re) synchronization (e.g., (re-)synchronizes to the DL of the SpCell) and/or UL synchronization (e.g., maintains the T430, informs the lower layers that UL synchronization is lost/obtained). The UE may perform/initiate an initial access or RRC resumption after the second timing.

In one or more examples, the UE is in an RRC idle (and/or RRC inactive) state at the first timing and the second timing. The UE performs a satellite switch with resynchronization at the second timing. The UE performs DL (re) synchronization and does not perform UL synchronization, e.g., based on the UE is not in an RRC connected state at the second timing, based on the UE is in the RRC idle (and/or RRC inactive) state at the second timing. The UE performs a satellite switch with resynchronization comprising DL (re) synchronization (e.g., (re-)synchronizes to the DL of the SpCell) and/or not comprising UL synchronization (e.g., maintains the T430, informs the lower layers that UL synchronization is lost/obtained). The UE may perform/initiate an initial access or RRC resumption after the second timing.

In one or more examples, the UE is in an RRC idle (and/or RRC inactive) state at the first timing and is in an RRC connected state at the second timing. The UE performs an initial access (e.g., RRC establishment) or RRC resumption after the first timing and before the second timing. The UE performs a satellite switch with resynchronization at the second timing, e.g., based on the UE is in the RRC connected state at the second timing. The UE performs a satellite switch with resynchronization comprising DL (re) synchronization (e.g., (re-)synchronizes to the DL of the SpCell) and/or UL synchronization (e.g., maintains the T430, informs the lower layers that UL synchronization is lost/obtained).

In one or more examples, the UE is in an RRC connected state at the first timing and the second timing. The UE may perform/initiate an initial access or RRC resumption before the first timing. The UE performs a satellite switch with resynchronization at the second timing, e.g., based on the UE is in the RRC connected state at the second timing. The UE performs a satellite switch with resynchronization comprising DL (re) synchronization (e.g., (re-)synchronizes to the DL of the SpCell) and/or UL synchronization (e.g., maintains the T430, informs the lower layers that UL synchronization is lost/obtained).

In one or more examples, the UE is in an RRC connected state at the first timing and is in an RRC idle (and/or RRC inactive) state at the second timing. The UE performs an RRC release after the first timing and before the second timing. The UE does not perform/initiate a satellite switch with resynchronization at the second timing, e.g., based on the UE is not in the RRC connected state at the second timing. The UE does not perform/initiate a satellite switch with resynchronization comprising DL (re) synchronization (e.g., (re-)synchronizes to the DL of the SpCell) and/or UL synchronization (e.g., maintains the T430, informs the lower layers that UL synchronization is lost/obtained).

In one or more examples, the UE is in an RRC connected state at the first timing and is in an RRC idle (and/or RRC inactive) state at the second timing. The UE performs a satellite switch with resynchronization at the second timing. The UE performs DL (re) synchronization and does not perform UL synchronization, e.g., based on the UE is not in the RRC connected state at the second timing, based on the UE is in the RRC idle (and/or RRC inactive) state at the second timing. The UE performs a satellite switch with resynchronization comprising DL (re) synchronization (e.g., (re-)synchronizes to the DL of the SpCell) and/or not comprising UL synchronization (e.g., maintains the T430, informs the lower layers that UL synchronization is lost/obtained).

Examples of text proposals on top of the current specification are provided in FIGS. 23-26.

In FIGS. 23-24, the UE determines to perform/initiate a first satellite switch with resynchronization based on the UE is in RRC_CONNECTED state at the time indicated by t-Service, after the time indicated by t-ServiceStart, or between the time indicated by t-ServiceStart and the time indicated by t-Service, regardless of the RRC state when/upon the UE receives an SIB19. The UE determines to perform/initiate a second satellite switch with resynchronization based on the UE is in RRC_CONNECTED state at the time indicated by t-Service, after the time indicated by t-ServiceStart, or between the time indicated by t-ServiceStart and the time indicated by t-Service, regardless of the RRC state when/upon the UE receives the SIB19. The UE performs the first satellite switch with resynchronization based on section 5.7.19 of the current specification (e.g., [3] Draft 3GPP TS 38.331 V18.0.0). The UE performs the second satellite switch with resynchronization based on FIG. 26.

In FIG. 25, the UE determines not to perform/initiate a second action(s) during a satellite switch with resynchronization based on the UE is not in an RRC_CONNECTED state.

Figure 27:
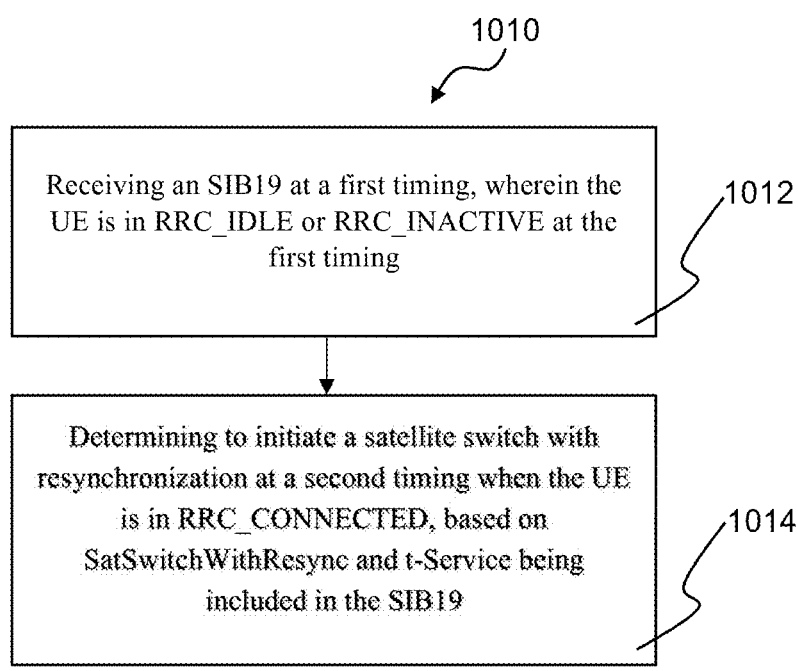
FIG. 27 is a flow diagram of a method of a UE in a wireless communication system comprising receiving an SIB19 at a first timing, wherein the UE is in RRC_IDLE or RRC_INACTIVE at the first timing, and determining to initiate a satellite switch with resynchronization at a second timing when the UE is in RRC_CONNECTED, based on SatSwitchWithResync and t-Service being included in the SIB19, in accordance with embodiments of the present invention.

Referring to FIG. 27, with this and other concepts, systems, and methods of the present invention, a method 1010 for a UE in a wireless communication system comprises receiving an SIB19 at a first timing, wherein the UE is in RRC_IDLE or RRC_INACTIVE at the first timing (step 1012), and determining to initiate a satellite switch with resynchronization at a second timing when the UE is in RRC_CONNECTED, based on SatSwitchWithResync and t-Service being included in the SIB19 (step 1014).

In various embodiments, the UE determines to initiate the satellite switch with resynchronization at the second timing, not only in a case where the UE is in RRC_CONNECTED at the first timing when receiving the SIB19 but also in a case where the UE is in RRC_IDLE or RRC_INACTIVE at the first timing when receiving the SIB19.

In various embodiments, the UE is in any of RRC_CONNECTED, RRC_IDLE, and/or RRC_INACTIVE at the first timing when receiving the SIB19.

In various embodiments, the first timing is a timing when the UE receives the SIB19.

In various embodiments, the second timing is a timing when the UE is in RRC_CONNECTED and/or a timing indicated by t-Service.

In various embodiments, the UE determines to initiate the satellite switch with resynchronization at the second timing, when/wherein the UE is in any RRC state at the first timing.

In various embodiments, the UE determines to initiate the satellite switch with resynchronization at the second timing regardless of an RRC state of the UE at the first timing.

In various embodiments, the UE determines to initiate the satellite switch with resynchronization based on an RRC state of the UE at the second timing and/or not based on the RRC state of the UE at the first timing.

In various embodiments, the second timing is different from the first timing.

In various embodiments, the second timing is later than the first timing.

In various embodiments, the method further comprises, in response to initiating the satellite switch with resynchronization: stopping a timer T430 if running, informing lower layers that a UL synchronization is lost due to the satellite switch with resynchronization, synchronizing to a DL of an SpCell served by a satellite indicated by SatSwitchWithReSync, starting the timer T430 with a timer value set to ntn-UlSyncValidityDuration from a subframe indicated by epochTime in SatSwitchWithReSync, and/or informing the lower layers when UL synchronization is obtained.

In various embodiments, the UE enters RRC_CONNECTED from RRC_IDLE or RRC_INACTIVE after receiving the SIB19 and/or the first timing.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive an SIB19 at a first timing, wherein the UE is in RRC_IDLE or RRC_INACTIVE at the first timing; and (ii) determine to initiate a satellite switch with resynchronization at a second timing when the UE is in RRC_CONNECTED, based on SatSwitchWithResync and t-Service being included in the SIB19. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:
    receiving a System Information Block 19 (SIB19) at a first timing, wherein the UE is in Radio Resource Control (RRC)_IDLE or RRC_INACTIVE at the first timing; and
    determining to initiate a satellite switch with resynchronization at a second timing when the UE is in RRC_CONNECTED, based on SatSwitchWithResync and t-Service being included in the SIB19.

2. The method of claim 1, wherein the UE determines to initiate the satellite switch with resynchronization at the second timing, not only in a case where the UE is in RRC_CONNECTED at the first timing when receiving the SIB19 but also in a case where the UE is in RRC_IDLE or RRC_INACTIVE at the first timing when receiving the SIB19.

3. The method of claim 1, wherein the UE is in any of RRC_CONNECTED, RRC_IDLE, and/or RRC_INACTIVE at the first timing.

4. The method of claim 1, wherein the first timing is a timing when the UE receives the SIB19.

5. The method of claim 1, wherein the second timing is a timing when the UE is in RRC_CONNECTED and/or a timing indicated by t-Service.

6. The method of claim 1, wherein the UE determines to initiate the satellite switch with resynchronization at the second timing when the UE is in any RRC state at the first timing and/or regardless of an RRC state of the UE at the first timing.

7. The method of claim 1, wherein the UE determines to initiate the satellite switch with resynchronization based on an RRC state of the UE at the second timing and/or not based on the RRC state of the UE at the first timing.

8. The method of claim 1, wherein the second timing is different from the first timing and/or later than the first timing.

9. The method of claim 1, further comprising, in response to initiating the satellite switch with resynchronization:
  stopping a timer T430 if running;
  informing lower layers that an Uplink (UL) synchronization is lost due to the satellite switch with resynchronization;
  synchronizing to a Downlink (DL) of a Special Cell (SpCell) served by a satellite indicated by SatSwitchWithReSync;
  starting the timer T430 with a timer value set to ntn-UlSyncValidityDuration from a subframe indicated by epochTime in SatSwitchWithReSync; and
  informing the lower layers when UL synchronization is obtained.

10. The method of claim 1, wherein the UE enters RRC_CONNECTED from RRC_IDLE or RRC_INACTIVE after receiving the SIB19.

11. A User Equipment (UE), comprising:
  a memory; and
  a processor operatively coupled with the memory, wherein the processor is configured to execute a program code to:
    receive a System Information Block 19 (SIB19) at a first timing, wherein the UE is in Radio Resource Control (RRC)_IDLE or RRC_INACTIVE at the first timing; and
    determine to initiate a satellite switch with resynchronization at a second timing when the UE is in RRC_CONNECTED, based on SatSwitchWithResync and t-Service being included in the SIB19.

12. The UE of claim 11, wherein the UE determines to initiate the satellite switch with resynchronization at the second timing, not only in a case where the UE is in RRC_CONNECTED at the first timing when receiving the SIB19 but also in a case where the UE is in RRC_IDLE or RRC_INACTIVE at the first timing when receiving the SIB19.

13. The UE of claim 11, wherein the UE is in any of RRC_CONNECTED, RRC_IDLE, and/or RRC_INACTIVE at the first timing.

14. The UE of claim 11, wherein the first timing is a timing when the UE receives the SIB19.

15. The UE of claim 11, wherein the second timing is a timing when the UE is in RRC_CONNECTED and/or a timing indicated by t-Service.

16. The UE of claim 11, wherein the UE determines to initiate the satellite switch with resynchronization at the second timing when the UE is in any RRC state at the first timing and/or regardless of an RRC state of the UE at the first timing.

17. The UE of claim 11, wherein the UE determines to initiate the satellite switch with resynchronization based on an RRC state of the UE at the second timing and/or not based on the RRC state of the UE at the first timing.

18. The UE of claim 11, wherein the second timing is different from the first timing and/or later than the first timing.

19. The UE of claim 11, wherein the processor further executes the program code, in response to initiating the satellite switch with resynchronization, to:
  stop a timer T430 if running;
  inform lower layers that a Uplink (UL) synchronization is lost due to the satellite switch with resynchronization;
  synchronize to Downlink (DL) of a Special Cell (SpCell) served by a satellite indicated by SatSwitchWithReSync;
  start the timer T430 with a timer value set to ntn-UlSyncValidityDuration from a subframe indicated by epochTime in SatSwitchWithReSync; and
  inform the lower layers when UL synchronization is obtained.

20. The UE of claim 11, wherein the UE enters RRC_CONNECTED from RRC_IDLE or RRC_INACTIVE after receiving the SIB19.

* * * * *